United States Patent [19]
Tagami et al.

[11] Patent Number: 5,808,433
[45] Date of Patent: Sep. 15, 1998

[54] METHOD OF GENERATING GAIT OF LEGGED WALKING ROBOT AND SYSTEM FOR CONTROLLING ITS LOCOMOTION

[75] Inventors: Katsutoshi Tagami; Yuji Haikawa, both of Saitama, Japan

[73] Assignee: Honda Giken Kogyo Kabushiki Kaisha, Tokyo, Japan

[21] Appl. No.: 719,717

[22] Filed: Sep. 25, 1996

[30] Foreign Application Priority Data

Sep. 29, 1995 [JP] Japan .................................... 7-276486
Sep. 29, 1995 [JP] Japan .................................... 7-276487

[51] Int. Cl.⁶ .......................... G05B 17/00; G05B 19/00; B62D 57/32
[52] U.S. Cl. ............................... 318/568.12; 318/568.11; 901/1; 180/8.6
[58] Field of Search ..................................... 318/560–696; 364/424.02–424.06; 395/80–89; 901/1.3, 5; 180/8.1–8.6; 414/732, 735

[56] References Cited

U.S. PATENT DOCUMENTS

| | | | |
|---|---|---|---|
| 5,151,859 | 9/1992 | Yoshino et al. | 364/424.02 |
| 5,221,883 | 6/1993 | Takenaka et al. | 318/568.12 |
| 5,323,650 | 6/1994 | Fullen et al. | 73/172 |
| 5,343,397 | 8/1994 | Yoshino et al. | 364/424.02 |
| 5,357,433 | 10/1994 | Takenaka et al. | 364/424.02 |
| 5,402,050 | 3/1995 | Ozawa | 318/568.12 |
| 5,404,086 | 4/1995 | Takenaka et al. | 318/568.12 |
| 5,426,586 | 6/1995 | Ozawa | 364/424.02 |
| 5,432,417 | 7/1995 | Takenaka et al. | 318/568 |
| 5,459,659 | 10/1995 | Takenaka | 364/424.02 |
| 5,513,106 | 4/1996 | Yoshino et al. | 364/424.02 |

FOREIGN PATENT DOCUMENTS

| | | |
|---|---|---|
| 0 488 693 A2 | 3/1992 | European Pat. Off. . |
| 0 572 285 a1 | 1/1993 | European Pat. Off. . |
| 3184782 | 12/1991 | Japan . |
| 688218 | 11/1994 | Japan . |

OTHER PUBLICATIONS

"Development of Biped Walking Robot Compensating for Three–Axis Moment by Trunk Motion", J. Yamaguchi, A. Takanishi and I. Kato, Department of Mechanical Engineering, Waseda University, Publication Date Jul. 26, 1993 (Proceedings of the 1993 IEE/RS) International Conference).

"Learning Control of Compensative Trunk Motion for Biped Walking Robot Based on ZMP Stability Criterion", Q. Li, A. takanishi and I. Kato, Dept. of Mechanical Engineering, Waseda University, Publication Date Jul. 7, 1992 (Proceedings of the 1992 IEEE/RSJ International Conference on Intelligent Robot and Systems).

"Effect on walking parameters of walking period and step in normal walking", Iida et al., Plsatic Surgery Biomechanics, vol. 5, 1983 (includes brief English explanation of the Abstract).

Journal of Robotics Society of Japan, vol. 11, No. 3, "Biped Walking Robot Compensating Moment by Trunk Motion" (includes brief English explanation of the Abstract) Feb. 1993.

*Primary Examiner*—Paul Ip
*Attorney, Agent, or Firm*—Lyon & Lyon LLP

[57] ABSTRACT

A method for generating a gait of a two-legged walking robot having a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction. In the method, a position of the robot body at a time when the hind leg has kicked the ground is estimated, and an amount of lift, in the direction of gravity, of a heel of the foot of the hind leg is determined such that the robot body will reach at least the estimated position. Then a vertical amplitude of the robot body trajectory is temporarily determined and is then corrected such that the vertical acceleration becomes a desired value, and the gait is then determined or generated based thereon. The robot locomotion is then controlled based on the generated gait.

42 Claims, 32 Drawing Sheets

FIG.21

CALCULATED EXAMPLE OF AMOUNT OF HEEL LIFTING

| | | |
|---|---|---|
| L 1 [mm] | 400.00 | [mm] |
| L 2 [mm] | 400.00 | [mm] |
| L T [mm] | 150.00 | [mm] |
| L A [mm] | 140.00 | [mm] |
| S T [mm] | 500.00 | [mm] |
| P S [%] | 20.00 | [%] |
| L [mm] | 800.00 | [mm] |
| L D [mm] | 100.00 | [mm] |
| L S [mm] | 200.00 | [mm] |
| L H [mm] | 914.60 | [mm] |
| L P [mm] | 150.00 | [mm] |
| t h C [deg] | 80.69 | [deg] |
| t h A [deg] | 43.03 | [deg] |
| L B [mm] | 205.18 | [mm] |
| L X [mm] | 926.82 | [mm] |
| t h B [deg] | 46.65 | [deg] |
| t h H m i n [deg] | 9.64 | [deg] |
| t h H m a x [deg] | 56.29 | [deg] |
| t h H [deg] | 32.96 | [deg] |

METHOD OF GENERATING GAIT OF LEGGED WALKING ROBOT AND SYSTEM FOR CONTROLLING ITS LOCOMOTION

BACKGROUND OF THE INVENTION

Field of the Invention

The present invention relates to a method of generating gaits of a legged walking robot and a system for controlling the locomotion of such a legged walking robot, and more particularly to a gait generating method for optimally designing actuators in the respective joints of a two-legged or biped mobile robot having a size which is as large as a human being, and effectively utilizing a robot through its mechanical strength and actuator capability, and a system for controlling the locomotion of such a legged walking robot.

Most conventional two-legged or biped walking robots have been constructed for the purpose of research activities rather than practical applications, and have had external control computers and power sources such as hydraulic pressure supplies and electric batteries. Many two-legged walking robots have been relatively small in size and weight. Few two-legged walking robots have been designed based on a detailed analysis of gait design from practical standpoints to reduce shocks from the ground ground reaction force) and increase energy consumption efficiency. While many two-legged walking robots satisfy physical conditions to allow themselves to walk with a stable posture, e.g., a theoretical minimum condition that the ZMP (Zero Moment Point) be positioned in the ground contact surface of a foot, they achieve a walking capability without strictly designed detailed conditions. Such an approach poses no significant problems insofar as the robots are small in size and weight.

The ZMP (Zero Moment Point) signifies "a point where moments about a pitch axis (an axis in the frontal plane) and a roll axis (an axis in the sagittal plane) on or inside of the sides of a supporting polygon that is formed by ground contact points of a foot sole and a ground surface are zero at any instant of walking."

One conventional two-legged walking robot which includes aspects according to these practical viewpoints is proposed in Japanese Patent Publication No. Hei 6(1994)-88218. The proposed two-legged walking robot is based on the observation of optimization of torques generated by actuators. However, the publication contains no description about any analysis of optimization of generated torques inherent in legged walking robots with feet and optimization in view of reduction of shocks from the ground (ground reaction force).

Two-legged mobile robots having a size which is as large as a human being are often considerably heavier than ordinary human beings. Unless shocks which they receive from the ground (ground reaction force) are reduced, they are subject to problems that will be faced in constructing them as a practical system, e.g., a problem in mechanical strength and a need for enhanced energy consumption efficiency for increasing continuous walking time or distance and posture stabilization.

Designing or generating gaits with consideration for those conditions cannot sufficiently be performed simply by satisfying physical conditions to allow the robots to walk with a stable posture, e.g., the condition that the ZMP be positioned in the ground contact surface of a foot sole, but it is required also that hardware conditions be satisfied including performance or output requirements of actuators output including their operating speed requirements and conditions for reducing shocks from the ground (ground reaction force) to a certain level or below.

There are a number of gaits that are physically possible to allow robots to walk, but not all gaits take into account the above practical limitations. It is not easy to select and design those gaits which satisfy such practical conditions among the physically possible gaits. Since two-legged walking robots which find use in various applications have different sizes and different walking speeds, it is more difficult to design or generate gaits optimum for such two-legged walking robots.

Nevertheless, gaits to be employed when a robot actually walks have to be considered in designing or determining performance or outputs of actuators including their operating speeds, etc. of the robot. While it is possible, in principle, to study in advance optimum gaits in view of all possible modes of use, such a process needs a large expenditure of labor and time because actual efforts are made through repeated experimentation based on actual robots for gait optimization.

If practically feasible gaits can be designed on an off-line or real-time basis and also once a robot application has been determined, then specifications for actuators and their operating speeds which meet such a robot application are determined so as to satisfy the most strict conditions in the robot application. Whereupon, it is not an appropriate approach to simply employ high-performance actuators and increase mechanical strength because of physical configurations and system costs.

SUMMARY OF THE INVENTION

It is therefore an object of the present invention to provide a method for easily generating a gait of a practical two-legged walking robot which allows actuators and their operating speeds to be quantitatively designed or determined and which are practically feasible, among numerous gaits that satisfy physical conditions, which permit the robot to walk with a stable posture, without carrying out a complex gait design.

Another object of the present invention is to provide a method for easily generating a gait of a practical two-legged walking robot which allows actuators and their operating speeds to be quantitatively designed or determined and which achieves a walking pattern with minimum undue stress to lessen shocks for the ground that are of importance for a practical robot, among numerous gaits that satisfy physical conditions which permit the robot to walk with a stable posture.

Still another object of the present invention is to provide a system for controlling the locomotion of such a two-legged walking robot whose gait is generated in the foregoing manner.

For achieving the objects, there is provided a method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; the method comprising the steps of estimating a position of the robot body at a time when the hind leg has kicked the ground; determining an amount of lifting, in the direction of gravity, of a heel of the foot of the hind leg such that the robot body will reach at least the estimated position; and generating a gait based at least on the determined amount of foot heel lifting.

BRIEF DESCRIPTION OF THE DRAWINGS

These and other objects and advantages of the invention will be more apparent from the following description and drawings, in which:

FIG. 21 is a diagram of parameters of the two-legged walking robot shown in FIG. 1 used in an example of the invention;

DETAILED DESCRIPTION OF THE PREFERRED EMBODIMENTS

A two-legged walking robot to which a gait generating method and a locomotion control system according to the present invention are applied will first be described below.

Figure 1:
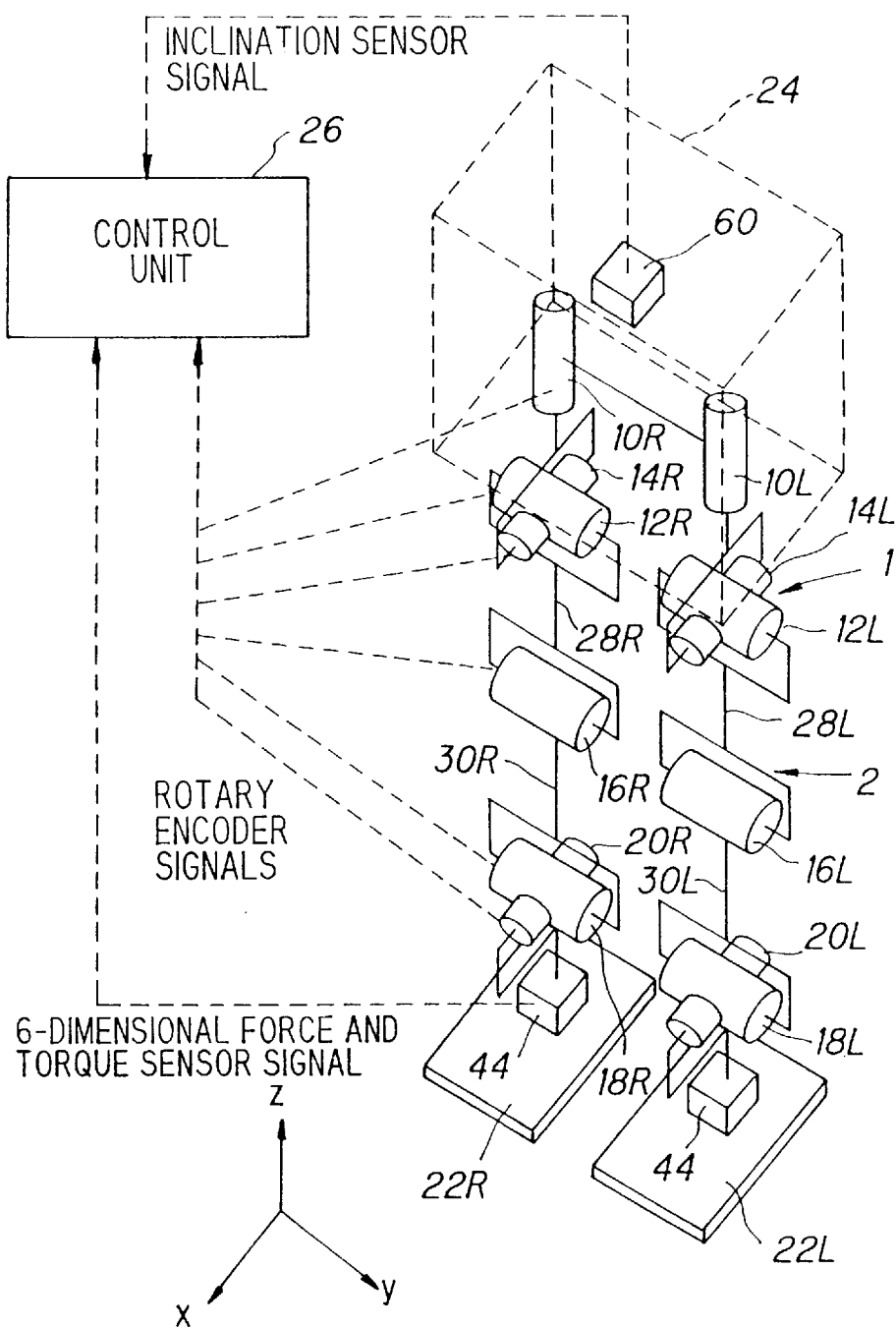
FIG. 1 is a skeleton diagram showing a two-legged walking robot, in its entirety, to which a gate generating method and a locomotion control system according to the present invention are applied.

FIG. 1 shows a skeleton diagram of a two-legged walking robot 1 in its entirety which has a pair of laterally spaced leg links 2 each composed of six joints. For an easier understanding, each of the joints is represented by an electric motor which actuates the joint. The joints include, arranged successively downward, a pair of joints 10R, 10L (the right-hand joint is indicated by R and the left-hand joint by L) for turning legs with respect to a hip, a pair of joints 12R, 12L for rolling movement with respect to the hip about a y-axis within a sagittal plane, a pair of joints 14R, 14L for pitching movement with respect to the hip about an x-axis within a frontal plane, a pair of joints 16R, 16L for rolling movement with respect to knees, a pair of joints 18R, 18L for rolling movement with respect to foot assemblies, and a pair of joints 20R, 20L for pitching movement with respect to the foot assemblies.

The foot assemblies have respective feet 22R, 22L. The two-legged walking robot 1 includes a body (trunk) 24 in its uppermost portion which houses therein a control unit 26 comprising microcomputers which will be described later on with reference to FIG. 3. The joints 10R(L), 12R(L), 14R(L) make up hip joints, and the joints 18R(L), 20R(L) make up ankle joints. The hip joints and knee joints are connected to each other by thigh links 28R, 28L, and the knee joints and ankle joints are connected to each other by crus links 30R, 30L.

With the above structure, each of the leg links 2 is given six degrees of freedom. When the 6×2=12 joints are driven to suitable angles while the two-legged walking robot 1 is walking, a desired motion is imparted to the entire legs to cause the two-legged walking robot 1 to walk arbitrarily in a three-dimensional space. The robot thus having at least a body, two articulated legs each connected to the body through a hip joint and each including a thigh link, a crus link connected to the thigh link through a knee joint and a foot connected to the crus link through an ankle joint, is configured to drive the articulated legs as a foreleg and a hind leg such that the hind leg kicks the ground to walk in a direction.

Figure 2:
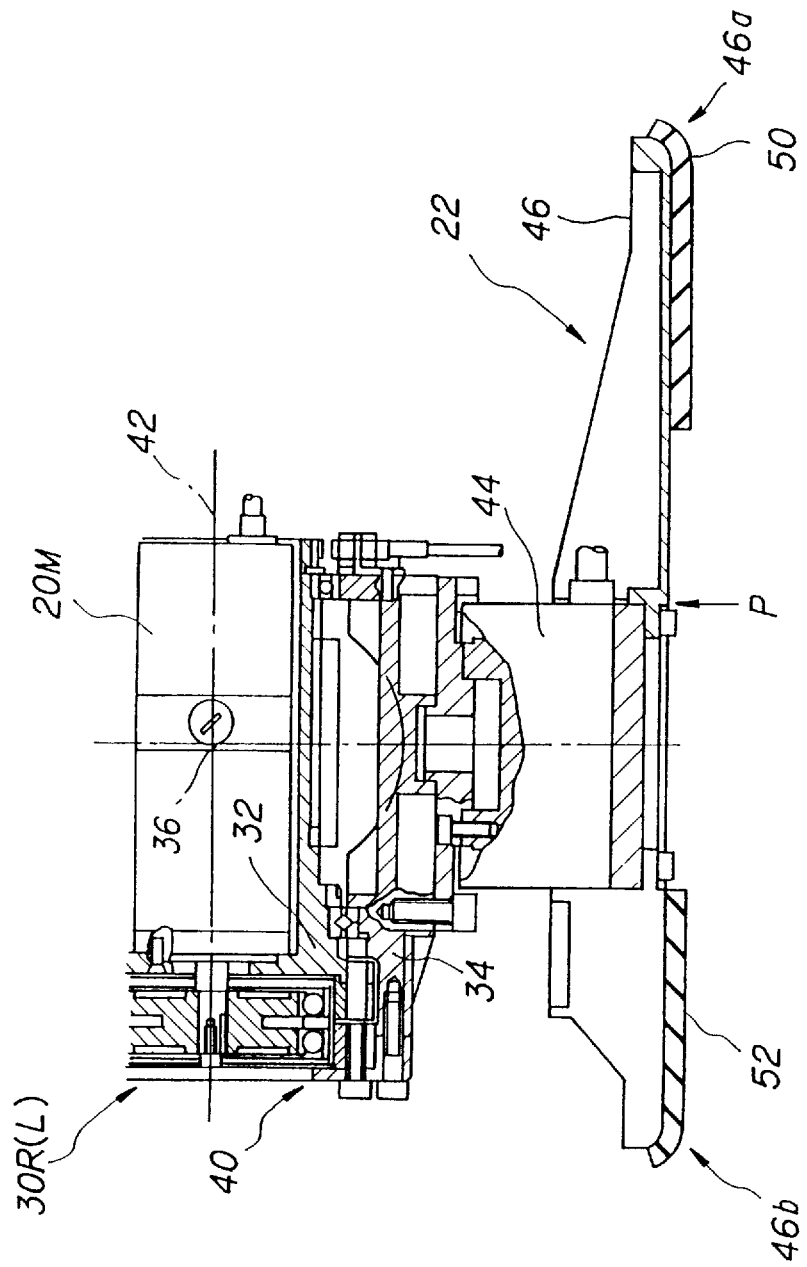
FIG. 2 is a cross-sectional view of a foot of the two-legged walking robot shown in FIG. 1.

FIG. 2 shows a detailed configuration of each of the foot assemblies in a cross section taken along the sagittal plane. The output power from an electric motor (not shown in FIG. 2) which actuates the ankle joint 18 is applied to an input end of a Harmonic speed reducer (trade name, not shown in FIG. 2), and reduced in speed and increased in torque at a suitable magnification in a known fashion for angularly moving a fixed member 32 attached to the crus link 30 and a rotary member 34 underneath the fixed member 32 in a forward direction in walking (within the sagittal plane) about an axis 36 (aligned with the axis of the ankle joint 18R(L)), thereby tilting or inclining the foot 22R(L) in the forward direction.

An electric motor 20M for driving the ankle joint 20 is disposed perpendicularly to the axis 36. The output power from the electric motor 20M is applied to a second Harmonic speed reducer 40 for angularly displacing the fixed member 32 and the rotary member 34 in a lateral direction (within the frontal plane) normal to the forward direction about a second axis 42 (aligned with the axis of the ankle joint 20R(L)), thereby tilting or inclining the foot 22R(L) in the lateral direction. The structural details of the above robot including the ankle joints are described in a prior application (Japanese Laid-Open Patent Publication No. Hei 3(1991)-184,782) proposed by the assignee, and hence will not be described in further detail.

A known six-dimensional force and torque sensor 44 is disposed below the rotary member 34 for measuring three directional components Fx, Fy, Fz of force and three directional components Mx, My, Mz of torque or moment thereby to detect whether the foot assembly is landed or not, or a load or force acting the robot through the foot assembly when it contacts the ground. The foot 22R(L) has a flat frame 46 which is positioned beneath the six-dimensional force and torque sensor 44. The frame 46 has a lower surface (foot sole) which is substantially flat, and includes a toe 46a and heel 46b to which resilient members 50, 52 are attached for dampening shocks (ground reaction force) that are imposed when the foot assembly is landed.

The body 24 has an inclination sensor 60 for detecting a tilt or inclination in the frontal plane with respect to a z-axis (the direction of gravity) and its angular velocity, and also a tilt in the sagittal plane with respect to the z-axis and its angular velocity. The electric motors of the respective joints are associated with respective rotary encoders for detecting angular displacements of the electric motors. Although not shown in FIG. 1, a zero reference switch 62 (see FIG. 3) for correcting an output signal from the inclination sensor 60 and a limit switch 64 (see FIG. 3) for fail-safe operation are disposed in suitable positions on the robot 1. Output signals from the six-dimensional force and torque sensors 44, the inclination sensor 60, the rotary encoders, the zero reference switch 62, and the limit switch 64 are sent to the control unit 26 in the body 24.

Figure 3:
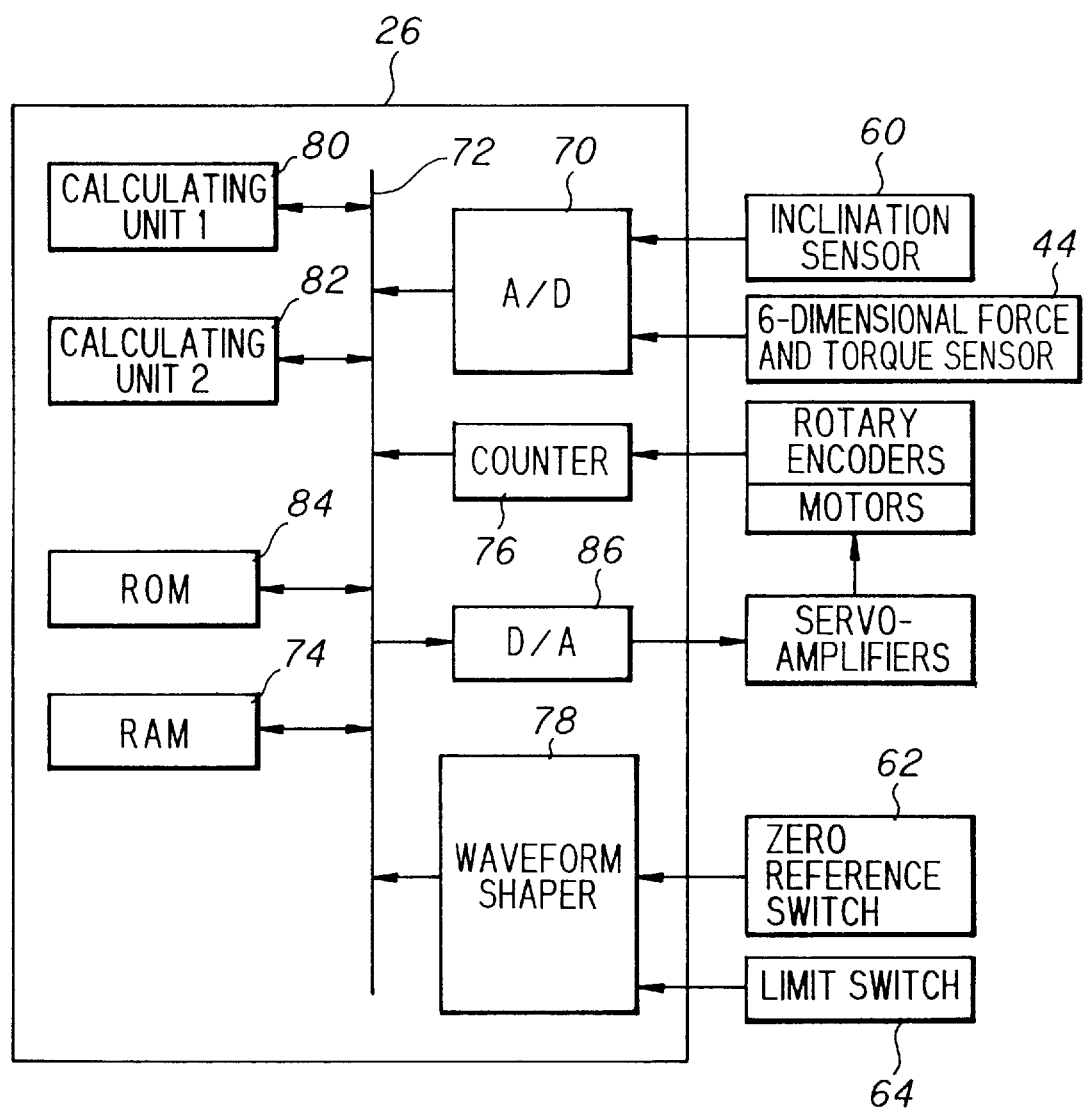
FIG. 3 is a block diagram showing details of a control unit of the two-legged walking robot shown in FIG. 1.

FIG. 3 shows in block diagram details of the control unit 26, which comprises microcomputers. Output signals from the sensors 44 and the inclination sensor 60 are converted by an A/D converter 70 into digital signals, which are transmitted through a bus 72 to a RAM 74. Output signals from the rotary encoders that are disposed adjacent to the respective electric motors are supplied through a counter 76 to the RAM 74. Output signals from the zero reference switch 62 and the limit switch 64 are transmitted through a waveform shaper 78 and stored in the RAM 74.

The control unit 26 includes first and second calculating units 80, 82 both composed of a CPU. The first calculating unit 80 reads gait parameters which are generated in a manner described later on and stored in a ROM 84, calculates desired joint angles, and outputs the calculated desired joint angles to the RAM 74. The second calculating unit 82 reads the desired joint angles and detected measured values from the RAM 74 as described later on, calculates manipulated variables (control inputs) necessary to drive the joints, and outputs the calculated manipulated variables through a D/A converter 86 and servo-amplifiers to the electric motors which actuate the respective joints.

Based on the two-legged walking robot of the above structure, a gait generating (gait designing) method and a system for controlling the locomotion of the two-legged walking robot according to the present invention will be described below.

1) General theory of gait design for the two-legged walking robot:

For gait design or generation, it is necessary to determine a walking speed, a walking step (walking foot stroke or stride), how to move or displace each foot, and how to move or displace the center of gravity of the robot.

It is well known in the art that, as described above, the ZMP is required to be present within the ground contact surface of a foot, as a restrictive or constraint condition for physically possible gaits such that the robot keeps a stable posture.

For developing practical robots, it is necessary to determine appropriate joint actuators and their operating speeds, reduce shocks received from the ground (ground reaction force), and increase the energy consumption efficiency of the robot for overall walking thereof, while keeping a stable posture.

If the robot is controlled to walk with its center of gravity at a low position, then the robot walks with its knees bending, and needs large retentive torques at all times. Therefore, it is advantageous in terms of energy consumption efficiency to keep the trajectory of the center of gravity as high as possible, i.e., to switch between support legs by moving or rotating them arcuately about a support point like stilts.

However, if the trajectory of the center of gravity is too high, then as the support leg tilts, and the center of gravity is necessarily lowered. Therefore, the center of gravity is subject to vertical displacement. If the vertical displacement of the center of gravity is large, then a vertical component of the ground reaction force increases. As a result, the feet tend to contact the ground poorly and suffer increased shocks from the ground.

For reducing the size and weight of the actuators, it is necessary to minimize the performance or outputs of the actuators. To meet such a requirement, gaits have to be designed in a manner to minimize maximum torques and maximum angular velocities that are required for the joints. According to practical gait designing, efforts are made to arrive at a compromise between the above contradictory conditions.

2) Procedure for designing actuator specifications:

For designing actuator specifications, it is necessary to determine its maximum torque and maximum rotational speed. Once a maximum torque and a maximum rotational speed are determined, it is possible to determine specifications including a maximum output and whether a speed reducer is to be added or not.

The maximum torque is determined by a gait and should dynamically be calculated from a strict viewpoint, though frequently no problems are posed even if it is statically calculated from the gait and the weight. The maximum angular velocity of the hip joint of the support leg is substantially determined depending on the walking speed and the interval or period of a single support phase because the robot is required to start the next walking step during the single support phase.

To determine the maximum angular velocity of the hip joint of the support leg, it is necessary to determine a (walking) step (walking stroke or stride) and a rate of locomotion, i.e., walking period (pitch) at which to start the walking step. Since the walking speed is equal to step× walking pitch, if the walking speed has been determined, it suffices if either the step or the walking pitch is determined. The step is closely related to the maximum torque of the hip joint, and the walking pitch is closely related to the maximum angular velocity of the hip joint.

The maximum angular velocity of a knee joint largely depends on the manner in which the foot 22R(L) of a swinging or lifted leg is moved or displaced, i.e., to which extent the foot 22R(L) should be lifted (the amount of foot lifting), or whether the foot is to be brought forward early or lately.

Similarly, the maximum angular velocity of an ankle joint 18, 20R(L) largely depends on the manner in which the foot of a swinging leg is moved or displaced. The hip joint 10, 12, 14R(L) of a swinging leg is greatly affected by the movement of the knee. Therefore, it is necessary to discuss how the foot 22R(L) is to be moved or displaced, i.e., the design and evaluation of a gait is required. A gait to be designed should preferably be optimum for maximizing the performance of the actuators.

Once a gait is determined, the maximum angular velocity of each joint is automatically determined from the gait, and necessary torques and maximum outputs of actuators can roughly be calculated as described above. Therefore, actuator specifications can be designed.

Designing of actuator specifications will be described in specific details below.

Figure 4:
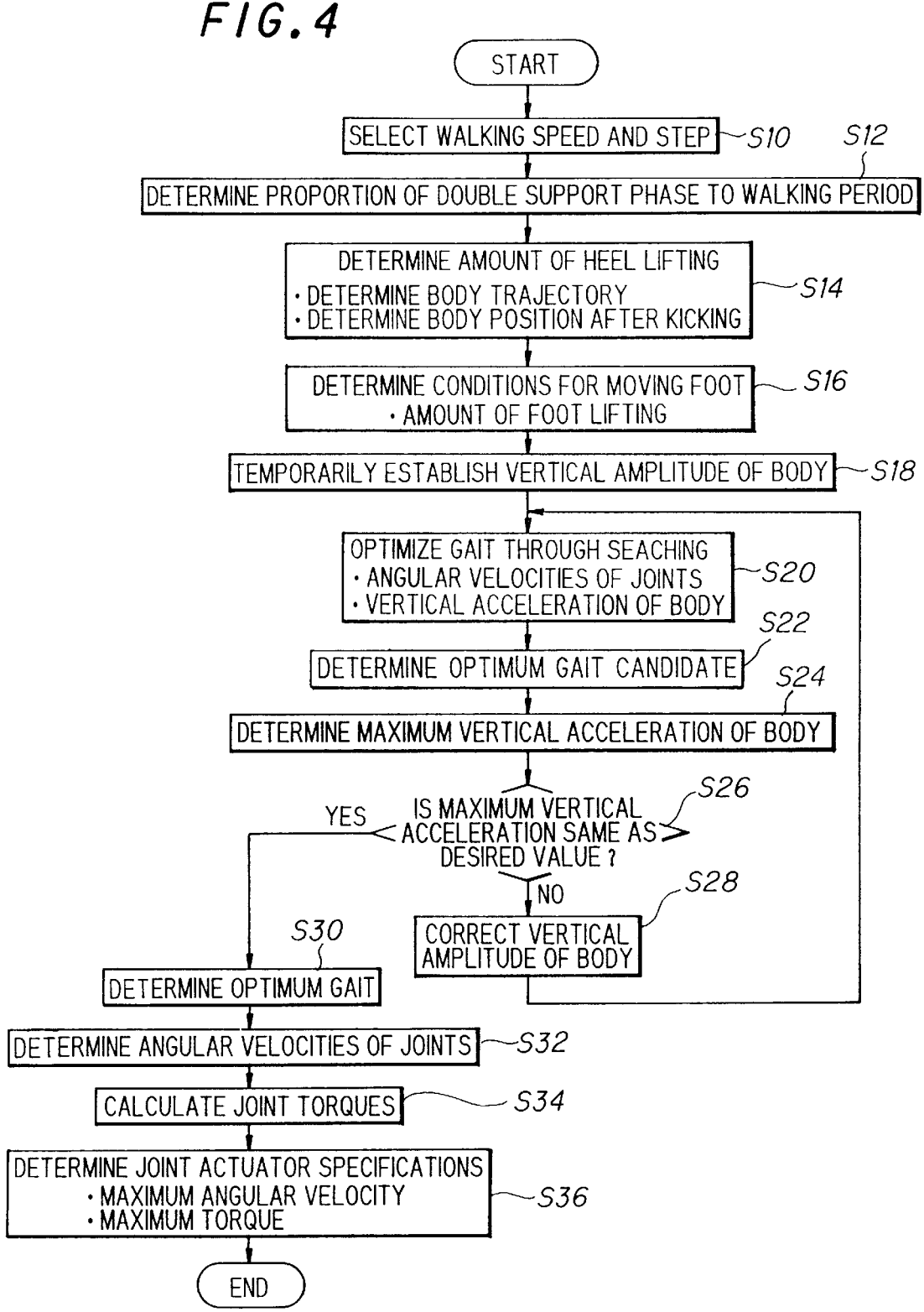
FIG. 4 is a flowchart showing the gait generating method according to the present invention which is applied to the two-legged walking robot shown in FIG. 1.

3) Procedure for designing actuators, including a procedure for designing a gait:

As described above, the final objective of designing a gait is to determine specifications of joint actuators, and to effectively utilize the mechanical strength of a robot and the actuator capabilities based on the gait for enabling the robot to walk. According to the present invention, procedures up to determining specifications of joint actuators are shown in FIG. 4. The process shown in FIG. 4 will be described below.

According to the procedures for designing or generating a gait, a walking speed and a step (walking step) are first selected in S10.

In actual walking, the walking speed and the step vary depending on the purpose of the walking. The walking speed and step should sometimes not selected arbitrarily, but have to be determined according to the circumstances in which the robot operates. For example, the walking speed cannot be increased in a place where it is difficult for the robot to walk, and the step is determined by limited positions where the feet are to be landed.

In determining joint actuator specifications, most strict specifications, i.e., a maximum walking speed and a maximum (walking) step, may be selected from among those which can possibly be used for actual walking. For example, specifications such as a maximum walking speed of 5 km/h and a maximum (walking) step of 750 mm may be selected.

According to a study directed to the walking pattern of human beings, for example, "Effect on walking parameters of walking period and step in normal walking", Iida, et al. Plastic Surgery Biomechanics, Vol. 5, 1983, the proportion of a double support phase to one walking period is about 15%. This means that the double support phase occupies about 30% of the time required to start one walking step.

The above walking mode is related to such walking features of human beings that the heel of a kicking (hind leg) foot rises or uprights into a nearly vertical position almost aligned with the toe when the heel is lifted off the ground. A two-legged walking robot is not necessarily required to have the same walking pattern as human beings. It has experimentally been known that the double support phase of a two-legged walking robot which is about 20% of the time required to start one walking step is practically desirable, considering an effect which it has on the operating speed of the ankle joints 18, 20R(L) as described later on.

In view of the above, the proportion of the time of a double support phase to one walking period is established in S12.

Then, the program goes to S14. In S14, the amount by which the foot 22R(L) of a swinging (hind) leg is tilted or inclined in the direction of gravity when it is lifted off the ground in the double support phase, i.e., the amount of heel lifting is determined from the (walking) step and the proportion of the time of the double support phase to the walking period.

The necessity of determining the amount of heel lifting and a process of determining the same will be described below. The gait of a two-legged walking robot in which the foot of a swinging leg slides on the ground, but is not lifted off the ground, while the robot is walking, is most efficient in terms of energy consumption. With that gait, however, the robot gets easily trapped by various irregular shapes such as surface irregularities on an actual walking ground surface, losing posture stability. Therefore, it is desirable to lift the swinging leg foot by at least a minimum amount or distance required, although the distance may vary depending on the circumstances. The amount of foot lifting of the swinging (hind) leg may be set to an appropriate value depending on the circumstances including surface irregularities on the walking ground surface.

If the swinging leg foot is elevated high, the knee is accordingly bent largely, and the maximum angular velocity of the knee joint 16R(L) becomes necessarily large. The angular velocities of the related hip joints 10, 12, 14R(L) are also increased. Consequently, it is practical to select, for the amount of lift of the swinging leg foot, a minimum height which is sufficient with respect to the most strict value under practically conceivable conditions of use. For example, a trajectory condition may be established such that "the swinging leg foot to be lifted to such a height as to be able to go over a concrete block having a width of 100 mm and a height of 30 mm."

It is possible, from the standpoint of dynamics, for a robot to walk without lifting its heels, just like a stilts robot that has no foot. According to the gait of a human being, it is known that heels are lifted a considerable amount or distance as can be understood from the study referred to above, in the walking pattern of human beings.

If a robot has the same walking pattern as a human being, then the heel of each of the feet of the robot is lifted or uprighted into a nearly vertical position almost aligning with the toe. Since the amount of heel lifting (the angle through which the heel is to be moved) and the maximum joint angular velocity will be increased, actuator outputs will then be increased, which is not preferable in the gait designing. Particularly, when the robot walks at a fast pace with the time of a double support phase being reduced, the angular velocity of the ankle joints is increased, causing a problem.

From the above standpoint only, a two-legged robot walking pattern in which the amount of heel lifting is small would be considered a qualitatively good gait.

If the heels of a robot are not lifted at all, however, it can easily be imagined that the robot has a walking pattern in which the trajectory of the center of gravity of the body is low, i.e., small in the direction of gravity and the knees are bent. At the same time, inasmuch as the heel is not lifted in a double support phase, the foot needs to be lifted more quickly in a foot lifting phase, with the result that the speed at which the swing leg knee is bent is increased.

For the gate of a two-legged walking robot, the amount of vertical displacement (displacement or movement in the direction of gravity) of the body 24 is also an important gait parameter. The amount of vertical displacement of the body 24 can not be determined solely from the length of the leg links alone because the length of the leg links varies as the knee joints 16R(L) are extended and bent. However, it is possible to determine the amount of vertical displacement of the body 24 according to a restrictive condition such that "a geometrically possible highest trajectory be selected."

Geometrically, any arbitrary trajectory may be selected for the body 24 insofar as it is lower than the geometrically possible highest trajectory. Since vertical displacement of the body 24 is largely responsible for shocks produced when the feet are landed (ground reaction force), the body 24 is preferably set to a trajectory with a reduced (vertical) amplitude for its vertical displacement. Naturally, such a reduced amplitude for the vertical displacement of the body 24 is achieved by lowering the trajectory thereof.

Figure 5:
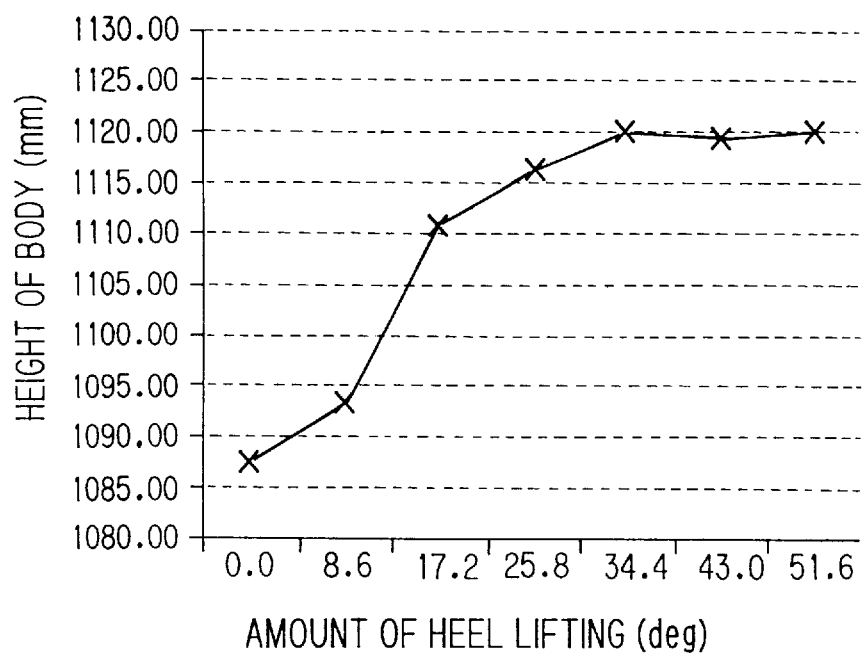
FIG. 5 is a diagram of data showing how the height of the trajectory of the center of gravity of a body of the robot varies as the amount of heel lifting varies under such a restrictive or constraint condition that the vertical acceleration of the two-legged walking robot shown in FIG. 1 is maintained at a constant value or lower.

4) Determination of an appropriate range for the amount of heel lifting:

FIG. 5 shows how the height of the trajectory of the center of gravity of the body 24 varies as the amount of heel lifting varies under such a restrictive or constraint condition that the vertical acceleration (the acceleration of displacement of the robot in the direction of the z-axis, i.e., in the direction of gravity) is maintained at a constant value or lower. It can be seen from FIG. 5 that the height of the trajectory is greatly lowered when the amount of heel lifting is smaller than a certain angle. This phenomenon is understood to signify that since the heel is not lifted enough, the hind leg foot movement would be restricted, and hence the body is lowered.

In view of the above data, according to the method of the embodiment, an appropriate range for the amount of heel lifting is determined on the basis of the principle that the heel should be lifted an amount or a distance large enough to keep the trajectory of the center of gravity of the body high. Specifically, the heel is lifted to enable the kicking foot, which is the hind leg foot when the robot walks, to support the body while the trajectory of the center of gravity of the body is kept high.

In order to determine the appropriate range for the amount of lift of the heel based on the above concept, it is necessary to estimate or predict the position of the body at the time the kicking foot has just finished its kicking action, so as to ensure the robot to keep the stabilized posture. That is, the height in the direction of gravity of the trajectory of the center of gravity of the body 24 is set to a desired value, and the position of the body 24 at the time the kicking foot has just finished its kicking action is estimated.

Since walking patterns have a very large degree of freedom as described above, the strict position of the body cannot be determined solely. However, the results of study of a number of walking patterns indicate that the position of the body 24 at the time the kicking foot has just finished its kicking action can be approximated in the following manner:

5) Approximations of the position of the body at the time the kicking foot has just finished its kicking action (at the end of a double support phase):

It is assumed that each of the thigh links 28R(L) and the crus links 30R(L) of the two-legged walking robot 1 has a length of 400 mm and the two-legged walking robot 1 has a walking speed ranging from 1 to 4 km/h. Since the robot cannot move in static walk, but moves completely in dynamic walk in this walking speed range, the walking speed range is sufficient for a review of walking patterns in the dynamic walk.

For a simpler description of the subject, movement or motion of the two-legged walking robot, which moves three-dimensionally, in the frontal plane will not be considered here as it has no essential bearing on this subject.

In movement or motion of the two-legged walking robot in the sagittal plane, the manner in which the center of load acting in the foot sole (equal to the ZMP or the center of the actual ground reaction force) is shifted or displaced does affect walking patterns.

The center of load in the foot sole in the ordinary walking pattern of a human being is positioned in the vicinity of the center of the foot on the average, although it fluctuates irregularly. The illustrated two-legged walking robot is not necessarily required to have the same point in the foot sole as a human being. However, if the center of load in the foot sole of the robot is positioned in the vicinity of the geometrical center of the sole of the foot 22R(L), then it is effective to increase a margin with which to generate forces for recovery or restoration from disturbances. Accordingly, such a walking pattern is considered a practically effective walking pattern for the robot.

Based on the above concept, the center of load in the foot sole (indicated by P in FIG. 2) is basically selected in the vicinity of the geometric center of the sole of the foot 22R(L), more specifically, selected to be spaced 30 mm in the forward direction from a point projected from the point of intersection between the ankle joints 18, 20R(L), i.e., the point of intersection between the axes 36, 42. However, the center of load may be positioned otherwise if it is difficult to bring the entire foot into contact with the ground such as when the robot walks on irregular surfaces or narrow landing spots.

The following results are obtained after various walking patterns have been studied under the above condition.

Figure 6:
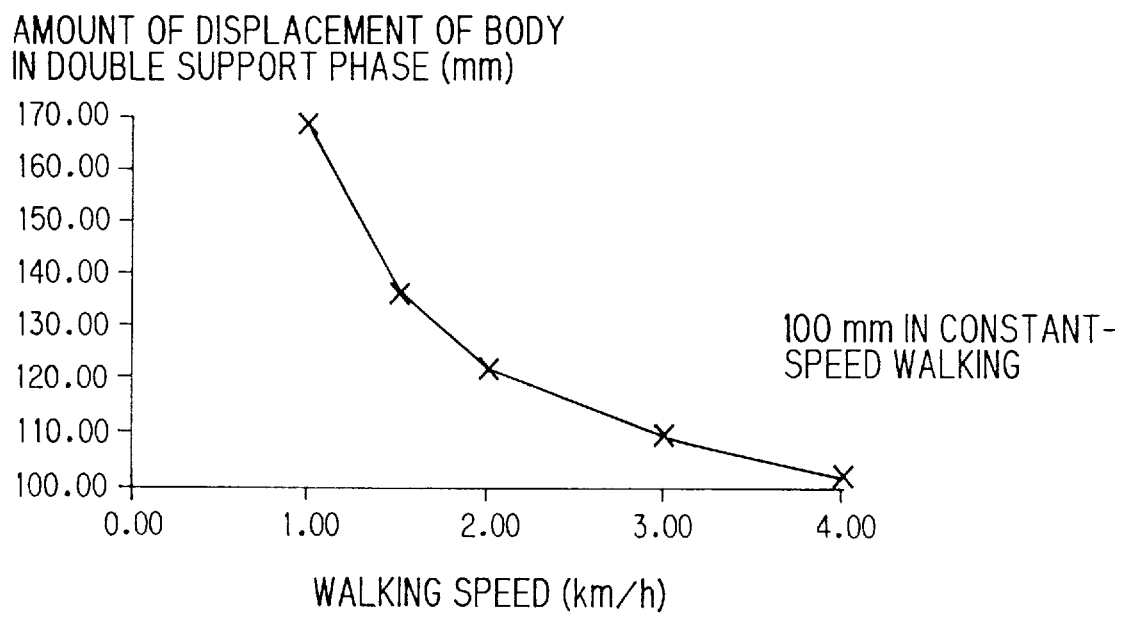
FIG. 6 is a diagram of data showing the amount of displacement of the body double support phase with respect to the walking speed of the two-legged walking robot shown in FIG. 1.

The trajectory of the center of gravity of the body 24 accompanies vertical displacement in the direction of the z-axis as can be seen from the fact that the body may be modeled as an inverted pendulum. As a consequence, the (displacement) velocity at which the body 24 displaces in the directions of the x- and y-axes also varies. Upon ordinary walking, the height of the body is low in a double support phase, and the velocities of displacement of the body in the double support phase are larger than the average walking speed of the robot. As shown in FIG. 6, variations of the velocities of displacement of the body are large upon low-speed walking, and small upon high-speed walking. With the size of the robot according to the embodiment, the velocities of displacement of the body are about 20% greater than the average walking speed (for constant-speed walking) at 2 km/h, and about 10% greater than the average walking speed at 3 km/h.

The velocities of displacement of the body are about 70% greater than the average walking speed at 1 km/h which represents a low-speed walking for the size of this robot. Extreme velocity variations upon low-speed walking are close to a static walking pattern. In the range of such a walking pattern, the amount of heel lifting can be designed in terms of static walk, and does not affect the vertical acceleration and energy consumption efficiency. Therefore, it is not necessary to apply the designing method according to the present invention in the range of such a walking pattern. Therefore, in the walking speed range in which velocity variations are not very large, the amount of heel lifting can be approximated by the walking speed which is the average velocity of displacement of the body.

Figure 7:
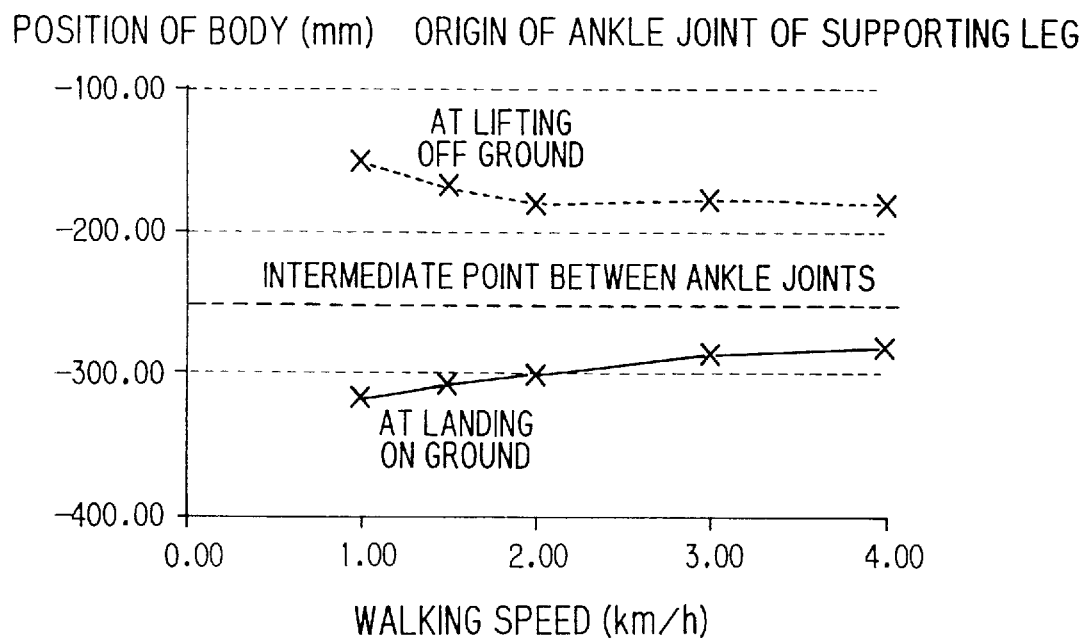
FIG. 7 is a diagram of data showing the position of the body in a double support phase with respect to the walking speed of the two-legged walking robot shown in FIG. 1.

In the double support phase, the center of gravity of the robot shifts from the hind leg toward the foreleg. FIG. 7 shows the position of the body 24 in the double support phase at a walking speed ranging from 1 to 4 km/h. It can be seen from FIG. 7 that the position of the body 24 in the double support phase is substantially intermediate between the ankle joints 18, 20R(L) of the foreleg and the hind leg, and its relationship to the walking speed is small.

A detailed review of the position of the body 24 indicates that the position of the body 24 depends slightly on the position of the center of load in the foot sole in the double support phase and the angle through which the heel 46b of the foot of the hind leg that is the kicking leg is lifted.

Figure 8:
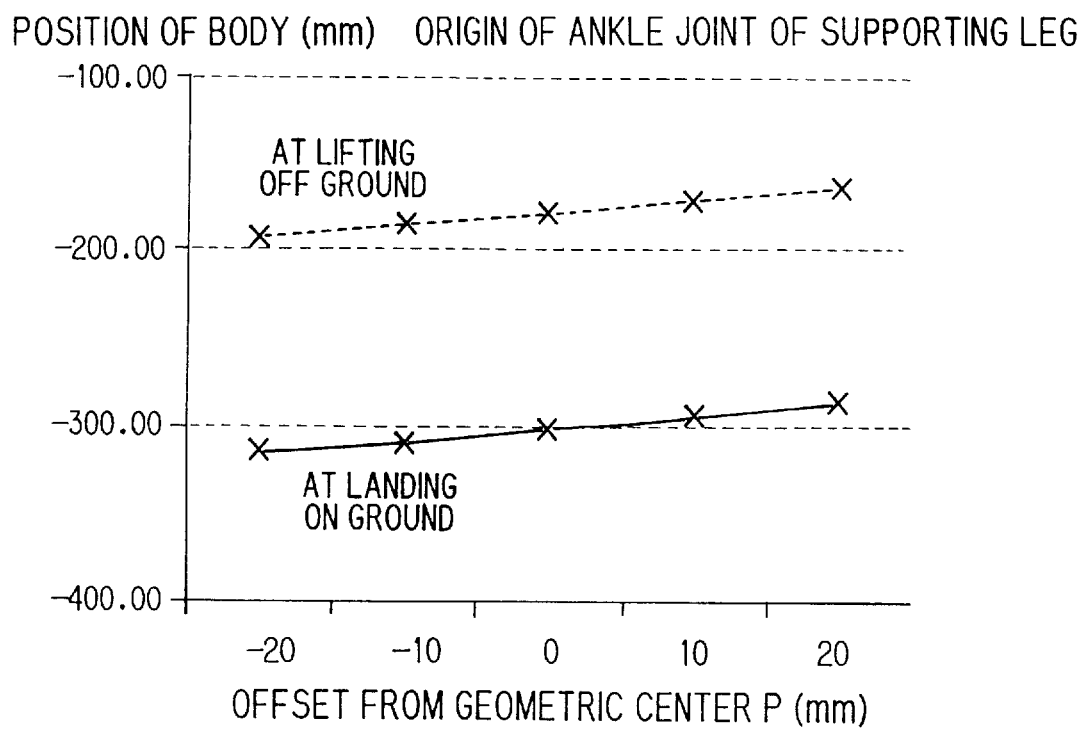
FIG. 8 is a diagram of data showing how the position of the body varies when the center of road acting on the sole of the foot of the two-legged walking robot shown in FIG. 1 is displaced back and forth from the geometrical center of the foot.

FIG. 8 shows how the position of the body 24 varies when the center of load in the sole of the foot 22R(L) is displaced back and forth from the geometrical center of the foot when the walking speed is 2 km/h and the step is 500 mm. As described above, the geometrical center of the foot is spaced 30 mm forward from the position of the ankle joint, as indicated by P in FIG. 2. It can be understood from FIG. 8 that when the center of load is moved forward, the body 24 tends to move forward. The distance that the position of the body 24 moves tends be in proportion to the amount or distance that the center of load is moved forward. However, the amount or distance that the position of the body 24 moves is not the same as, but smaller than, the amount or distance that the center of load is moved forward.

With the center of load set to the point P, the body 24 is moved 50 mm backward of the intermediate point when the foot is landed on the ground, and 70 mm forward of the intermediate point when the foot is lifted off the ground. The position of the body 24 in the double support phase is displaced 10 mm, on the average, forward of the intermediate point.

Figure 9:
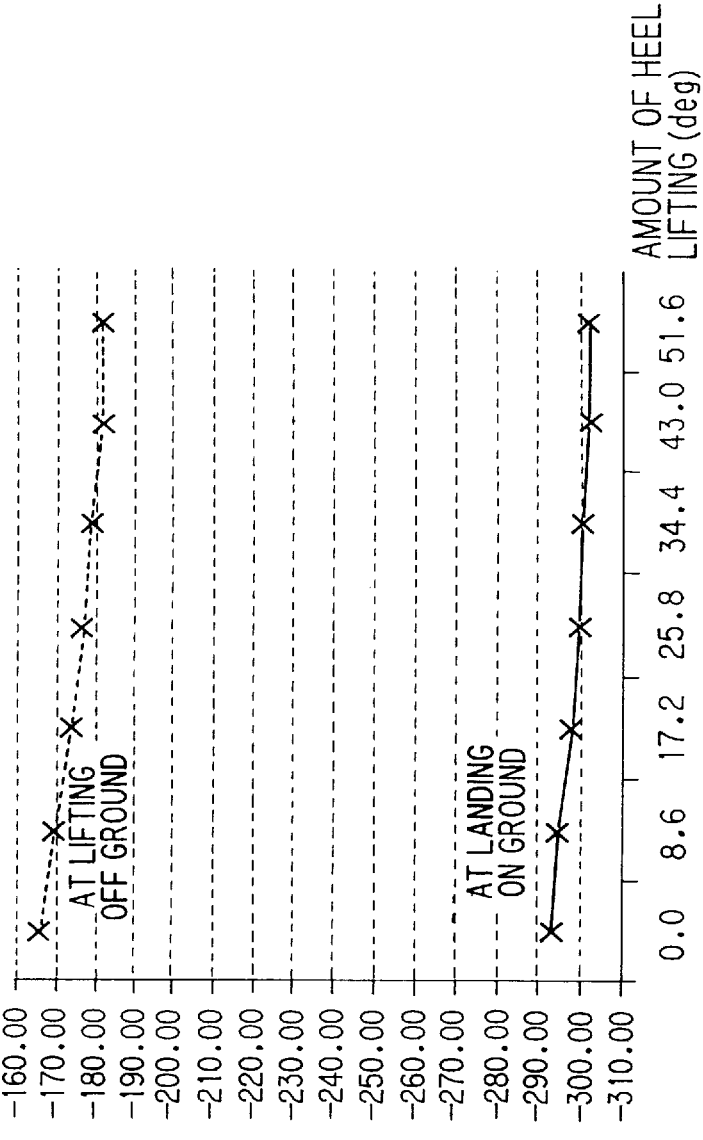
FIG. 9 is a diagram of data showing the relationship between the position of the body and the amount of heel lifting of the two-legged walking robot shown in FIG. 1.

The position of the body 24 also moves depending on the amount of heel lifting (the angle through which the heel 46b is lifted). FIG. 9 shows the relationship between the position of the body 24 and the amount of heel lifting when the walking speed is 2 km/h and the step is 500 mm. A study of the position of the body 24 at various lifting amounts (angles) ranging from no heel lift to a heel lift through 0.9 (rad.) reveals that as the heel is lifted, the position of the body 24 in the double support phase tends to be displaced backward a distance amount of or over 10 mm.

It can be seen from the above two findings that at the end of the double support phase, i.e., when the hind leg is lifted off the ground, any error of the position of the body 24 falls within a maximum of about 30 mm forward even if it is approximated that the body 24 has moved from the intermediate point between the foreleg and the hind leg for half of the time of the double support phase at the walking speed at the time.

The error appears to be correctable to a certain extent by parameters including the size of the robot and the walking speed. However, if a too complex corrective formula is employed, then it is difficult to determine its parameters, and the corrective formula will not be useful to design specific details of actuators.

In view of the above considerations, it is practically reasonable to simply approximate that at the end of the double support phase, i.e., when the hind leg is lifted off the ground, the body has moved from the intermediate point between the foreleg and the hind leg for half of the time of the double support phase at the walking speed at the time.

6) Amount of heel lifting:

A minimum amount of heel lifting in order to enable the kicking (hind leg) foot to reach the ground with respect to the position of the center of gravity of the body which has been approximately estimated as described above, is calculated as shown in FIG. 10.

Figure 10:
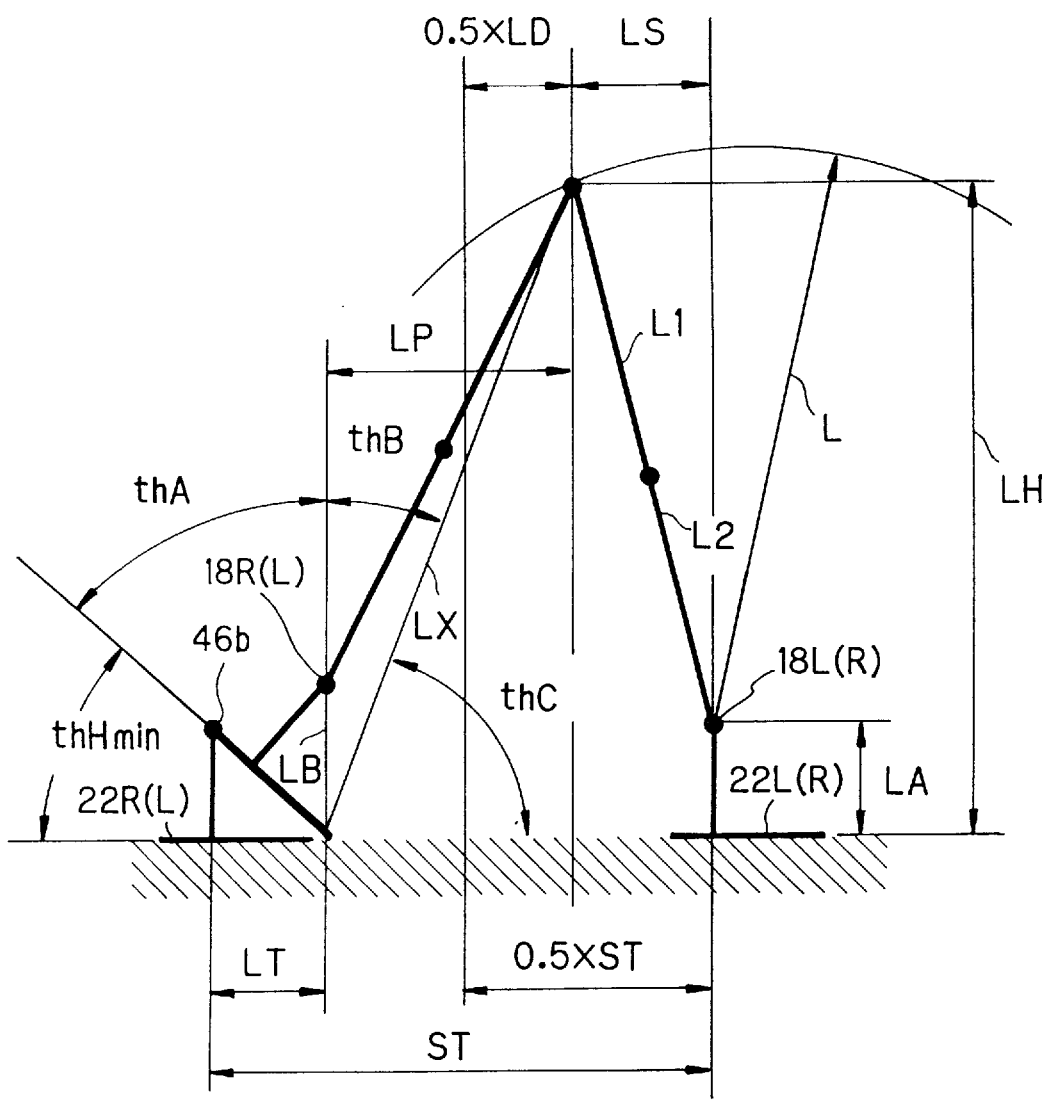
FIG. 10 is a diagram showing the calculation of a lower limit of the amount of heel lifting of the two-legged walking robot shown in FIG. 1.

It is assumed that L represents the sum of the length (L1) of the thigh link and the length (L2) of the crus link (this means a trajectory with the leg extended), ST represents the (walking) step, PS represents the proportion of the double support phase in one walking period, LT represents the length from the point projected from the point of intersection between the ankle joints 18, 20R(L) onto the foot sole to the toe, LA represents the length from the foot sole to the point of intersection between the ankle joints 18, 20R(L), LD represents the distance that the body moves in the double support phase, LH, LP, thA, thB, thC represent respective dimensions shown in FIG. 10, and thHmin represents the minimum amount of heel lifting. The above dimensions are expressed as follows:

```
LD = ST × PS,
LS = 0.5 × (ST − LD),
LH = LA + √ (L × L − LS × LS),
LP = ST − LS − LT,
thC = tan⁻¹(LH/LP),
thA = tan⁻¹(LA/LT),
LB = √ (LT × LT + LA × LA),
LX = √ (LP × LP + LH × LH),
thB = cos⁻¹{(LB × LB + LX × LX − L × L)/2.0/LB/LX}, and
thHmin = π − thA − thB − thC.
```

The amount thHmin of heel lifting of the kicking foot, required for the center of gravity of the body 24 to reach a position (indicated by LS) for half of the time of the double support phase at the walking speed at the time, is used as a lower limit, and a gait should be generated to achieve such an attitude.

Summarizing the above, it can be said that the amount of tilt or inclination of the foot can be controlled using the equation:

$$thH = f(PS, ST),$$

or $$thH = \pi - thA - thB - thC.$$

In the robot disclosed in the embodiment, since the toe 46a of the foot is turned arcuately or rotated and the radius of the arc or curved shape thereof is small and it is simply added to the tip end of the foot, the length LT may be defined as described above while ignoring the arc shape.

Figure 11:
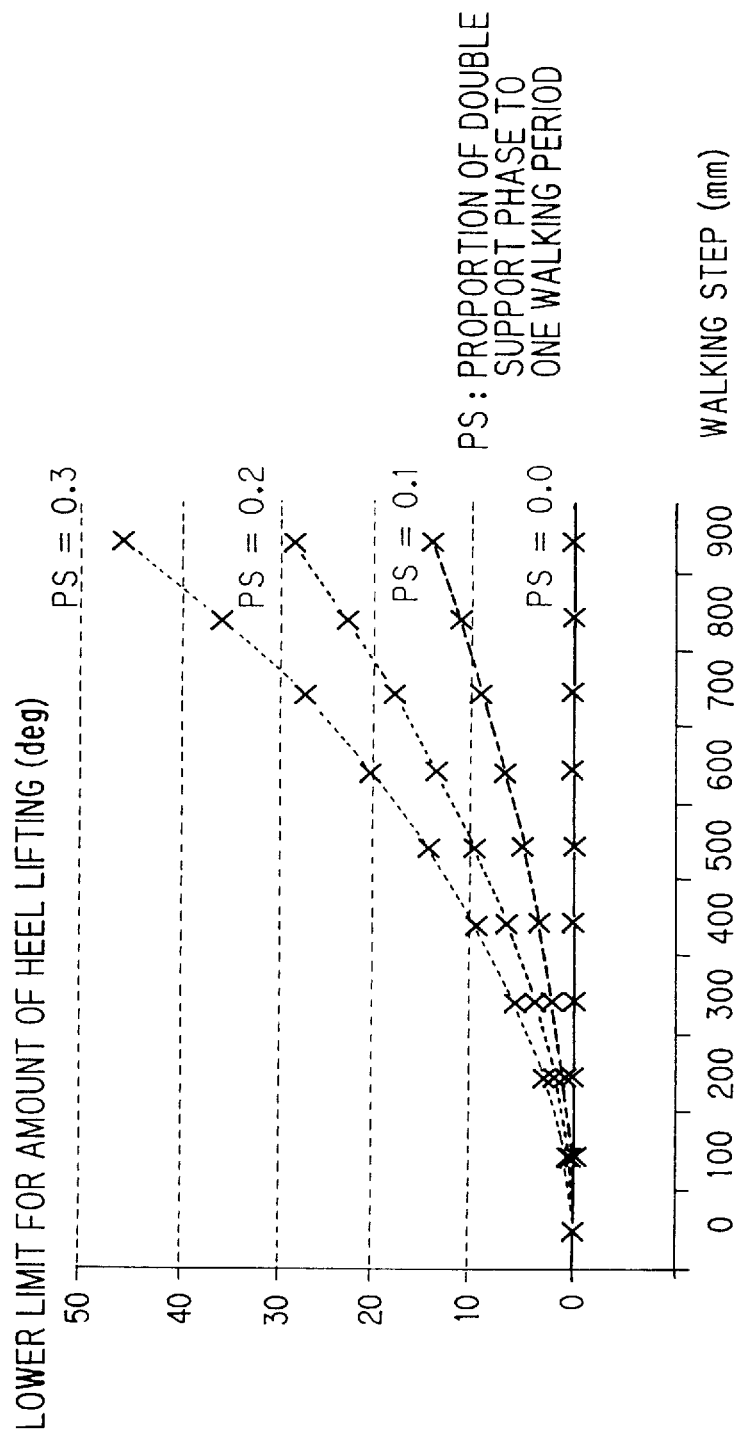
FIG. 11 is a diagram of data showing the relationship between the amount of heel lifting and the step of the two-legged walking robot shown in FIG. 1.

Amounts of heel lifting calculated with respect to several steps and proportions of the double support phase are shown in FIG. 11.

Figure 12:
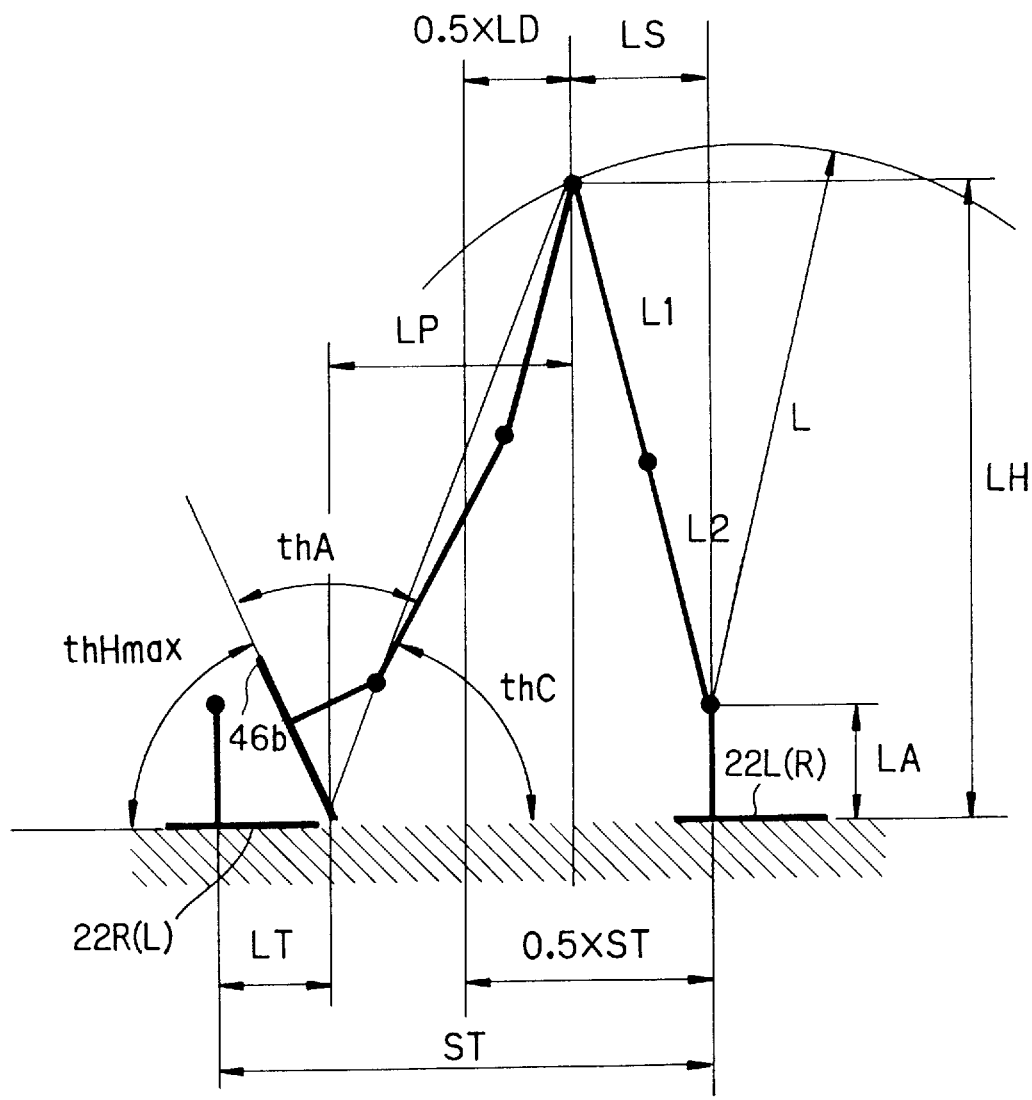
FIG. 12 is a diagram showing the calculation of an upper limit for the amount of heel lifting of the two-legged walking robot shown in FIG. 1.
Figure 13:
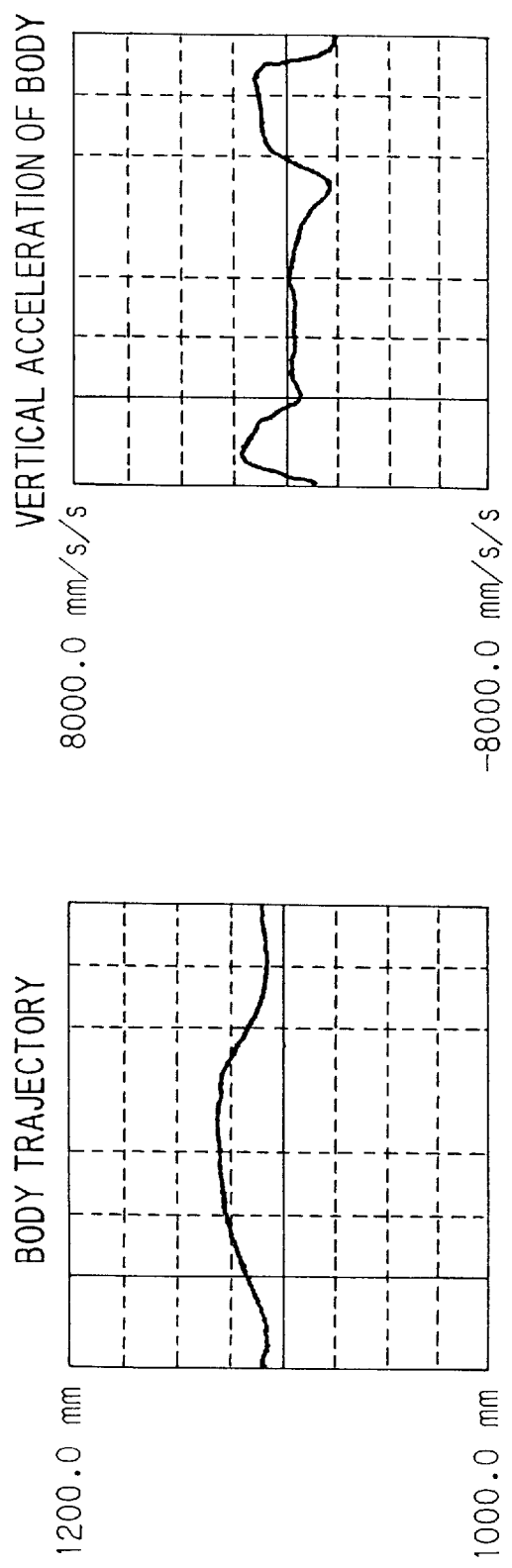
FIG. 13 is a diagram of data showing the relationship between the trajectory of the center of gravity of the body and the vertical acceleration while the amplitude of the vertical displacement of the body is kept constant when the two-legged walking robot shown in FIG. 1 walks at a walking speed of 2 km/h.
Figure 14:
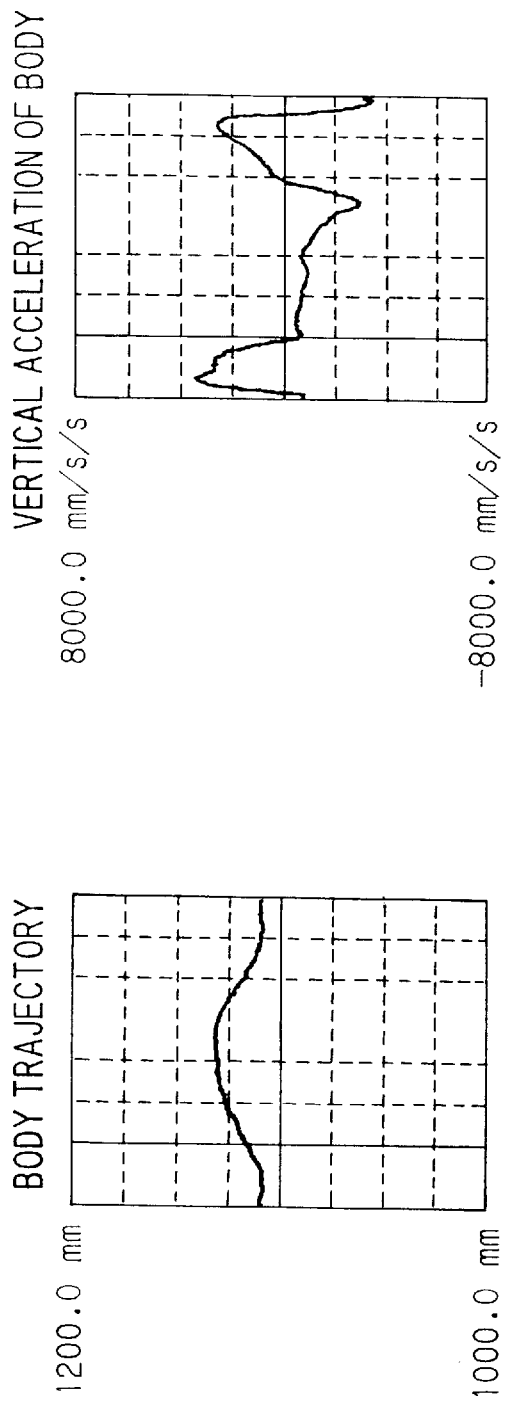
FIG. 14 is a diagram of data showing the relationship between the trajectory of the center of gravity of the body and the vertical acceleration while the amplitude of the vertical displacement of the body is kept constant when the two-legged walking robot shown in FIG. 1 walks at a walking speed of 3 km/h.
Figure 15:
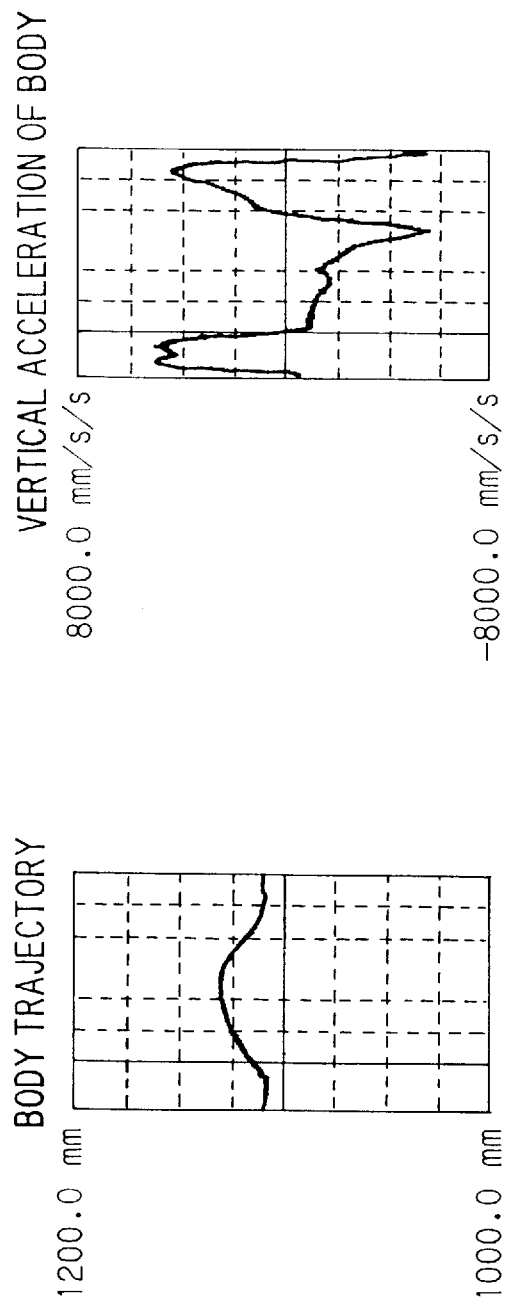
FIG. 15 is a diagram of data showing the relationship between the trajectory of the center of gravity of the body and the vertical acceleration while the amplitude of the vertical displacement of the body is kept constant when the two-legged walking robot shown in FIG. 1 walks at a walking speed of 4 km/h.
Figure 16:
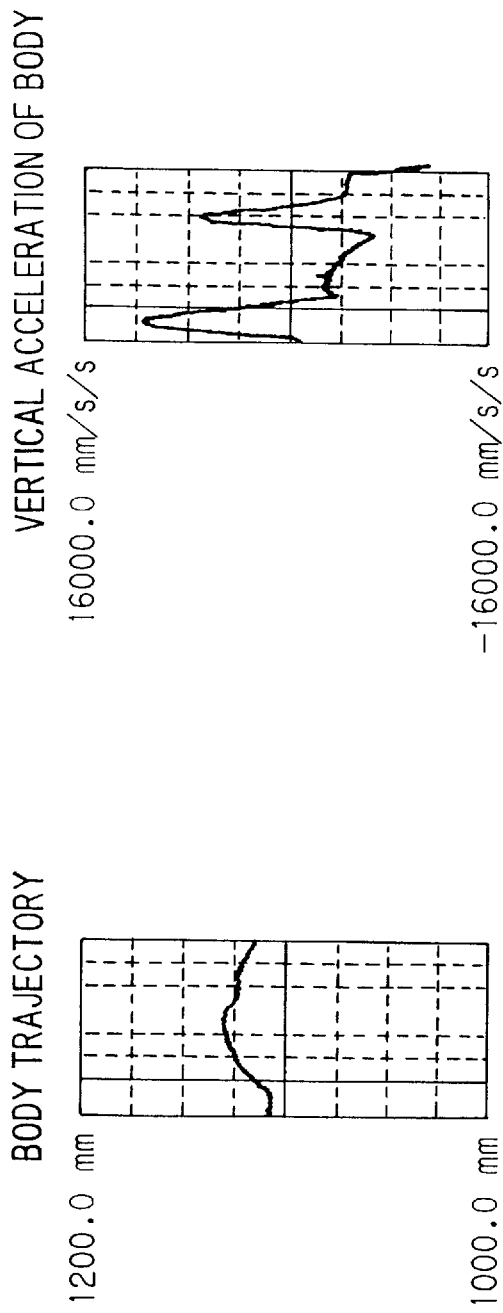
FIG. 16 is a diagram of data showing the relationship between the trajectory of the center of gravity of the body and the vertical acceleration while the amplitude of the vertical displacement of the body is kept constant when the two-legged walking robot shown in FIG. 1 walks at a walking speed of 5 km/h.

With respect to the upper limit thHmax for the amount of heel lifting, from the standpoint of increasing the height in the direction of gravity of the trajectory of the center of gravity of the body as high as possible, it is not effective to lift the heel 46b beyond a height in which the toe 46a, the ankle joint 18R(L), and the hip joint 12R(L) are substantially aligned with each other as shown in FIG. 12. Therefore, the upper limit thHmax is defined as follows:

$$thHmax = \pi - thA - thC.$$

With the upper and lower limits for the amount of heel lifting being thus determined, a designed value for the amount of heel lifting may lie, in principle, between those upper and lower limits. However, since the lower limit is a minimum amount or distance required to keep the trajectory of the center of gravity of the body at a desired height, if the heel 46b is lifted higher, then the height of the body may be increased to a certain extent (see FIG. 5). Therefore, as long as the driving capability of the actuators permits, it will bring no problem to lift the heel 46b beyond the lower limit.

According to this embodiment, with a view to maintaining a margin from the lower limit and not lifting the heel unnecessarily, the average of the upper and lower limits is selected as a design value for the amount of heel lifting.

7) Continued procedure for designing actuators:

After the amount of heel lifting has been determined, the program goes to S16 in which conditions for moving or displacing the foot, e.g., the amount of foot lifting of the hind leg, are determined. The trajectory of the foot 22R(L) may be generated by a spline function which generates a smooth trajectory in a range of satisfactory trajectory conditions or any other means for generating smooth curves, after the amount of heel lifting at the time the support (hind) leg is lifted off the ground in the double support phase is determined.

The program then goes to S18 in FIG. 4 in which the vertical amplitude of the body trajectory is temporarily or provisionally established or determined, arid in S20 a gait is optimized through searching. Specifically, a gait is optimized in order to minimize the angular velocities of the joints and the acceleration of displacement of the body 24 in the directions of the x- and y-axes. Then, in S22, a candidate for an optimum gait is determined.

Several methods for generating a dynamic gait prior to optimization of the gait have been revealed (one example is Journal of the Robotics Society of Japan, Vol. 11, No. 3, "Biped Walking Robot Compensating Moment by Trunk Motion"). The method may be applied to generate a gait. The above document discloses a method of generating a gait from the trajectory of a swinging leg and the trajectory of a ZMP while the position of the center of gravity of the body (trunk) is kept at a constant height. There is no problem even if a smooth trajectory for keeping the body high so as not to bend the knees is determined. The trajectory may be determined directly or depending on the trajectory of the swinging leg and the trajectory of the ZMP under restrictive or constraint conditions that ensures the posture stability separately established.

The gate that has been generated in the procedures up to S22 may not necessarily satisfy conditions as to whether shocks caused when the foot is landed (ground reaction force) fall within an allowable range with respect to the vertical acceleration of the body (the acceleration of displacement in the direction of the z-axis). Therefore, a maximum value for the vertical acceleration of the upper body is established in S24, so that the vertical acceleration will be held in a range below the maximum value. Details of the above will be described below.

8) Relationship between the walking speed and the magnitude of vertical displacement of the body:

In the two-legged or biped mobile robot 1 shown in FIG. 1, the weight of the body 24 constitutes a considerable portion of the entire weight of the robot. Since the magnitude of vertical displacement of the center of gravity of the body is directly related to dynamic loads acting on the legs and shocks received from the ground (ground reaction force), designing the trajectory of the center of gravity of the body is a significant theme to be considered.

Specifically, forces of inertia generated by vertical displacement of the center of gravity of the body are involved in the designing of outputs of actuators to be installed at the leg links which support the robot, and are also related to the strength of the leg links, the strength of the six-dimensional force and torque sensor 44 for measuring reactive forces from the ground, which directly bears the forces, and the ability of the feet to contact the ground from the standpoint of walking control, i.e., posture stability. In view of these aspects, any vertical displacement of the center of gravity of the body should preferably be small. However, smaller vertical displacement of the center of gravity of the body results in a walking pattern in which the trajectory of the center of gravity of the body is low and the energy consumption efficiency is poor. Consequently, the center of gravity of the body should be subject to a certain degree of vertical displacement.

Nevertheless, it is necessary to limit the vertical displacement in order to reduce loads exerted on the legs below a certain level. The robot will not leap or jump off the ground when the vertical acceleration does not exceed 1 G. Actually, even when the vertical acceleration is considerably smaller than 1 G, the ability of the feet to contact the ground may be lowered owing to ground surface irregularities, control errors, etc. With the illustrated robot structure, it has experimentally been verified that no problem will be caused if the vertical acceleration is held to a level of about 0.2 G.

Lowering the vertical acceleration to such a level, however, limits walking patterns greatly. Therefore, except for low-speed walking patterns in which the vertical acceleration causes no problem, a walking pattern in which the vertical acceleration is produced fully up to its limit that is determined depending mainly on the mechanical strength is often an optimum walking pattern. In order to realize such a walking pattern in which the vertical acceleration is produced fully up to its limit, it is necessary to discuss the walking speed and vertical acceleration of the two-legged walking robot.

Generally, insofar as the trajectory configuration of vertical displacement caused by walking remains the same, the velocity of vertical displacement increases in proportion to the walking speed and the vertical acceleration increases in proportion to the square of the walking speed. If it is assumed, for the sake of brevity, that the trajectory of vertical displacement is represented by a sine wave having an amplitude A and a wavelength L, then the height H of the body when the robot moves at a walking speed V is expressed by:

$$H = A \sin (2\pi V/Lt)$$

where t is the time.

By differentiating the above equation twice with respect to the time t, the acceleration DDH is expressed by the following equation:

$$DDH = -A(2\pi V/L)^2 \sin (2\pi V/Lt).$$

According to this equation, the acceleration DDH of vertical movement is proportional to the square of the walking speed V.

While an actual trajectory of vertical displacement is not a sine wave (function), it can be reduced to a Fourier series expansion as it is a periodic function. Since the acceleration of each of its terms is in proportion to the square of the walking speed V, the magnitude of vertical acceleration caused by vertical displacement is evidently proportional to the square of the walking speed V if the trajectory configuration of vertical displacement remains completely the same irrespective of the walking speed.

Motion of the two-legged walking robot is, however, subject to large limitations according to the equation of motion. It is difficult to keep the trajectory of vertical displacement of the body completely unchanged when the walking speed is changed. Strictly, therefore, it cannot be said that the magnitude of vertical acceleration is proportional to the square of the walking speed V.

To employ the above from the standpoint of engineering, it is necessary to evaluate how large the error may be. As a result of designing and analyzing gaits under many conditions, it has been found out that the magnitude of vertical acceleration is qualitatively approximately proportional to the square of the walking speed V.

FIGS. 13 through 16 show simulated data of the trajectory of the center of gravity and the vertical acceleration of the body 24 when the lengths of the thigh links 28R(L) and the crus links 30R(L) are 400 mm, the ankle joint height (LA) is 140 mm, the weight of the robot 1 is 100 kg, and the amplitude of vertical displacement of the center of gravity of the body 24 is kept at a constant level of 22 mm at walking speeds of 2 km/h, 3 km/h, 4 km/h, and 5 km/h.

Figure 17:
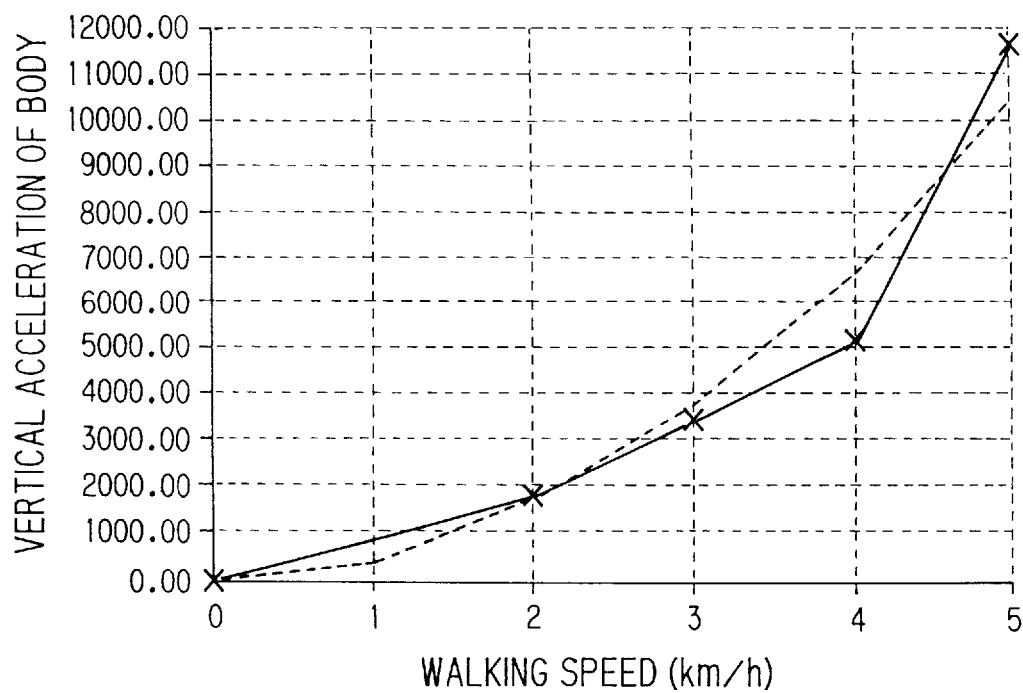
FIG. 17 is a diagram of data showing the relationship between the vertical acceleration and the walking speed of the two-legged walking robot shown in FIG. 1.

It can be understood from FIGS. 13 through 16 that as the walking speed increases, the trajectory configurations of vertical displacement appear considerably similar to each other though their time base changes depending on the walking speed, and the vertical acceleration increases as expected. The relationship between the walking speed and the maximum vertical acceleration is indicated by the solid-line curve in FIG. 17. The broken-line curve in FIG. 17 represents calculated values for the vertical acceleration which is assumed to be proportional to the square of the walking speed, with the vertical acceleration at 2 km/h being used as a reference. Comparison between the solid- and broken-line curves shows that the vertical acceleration is approximately, but not strictly, proportional to the square of the walking speed.

In the two-legged walking robot which can vary its walking speed, as described above, requirements for the vertical acceleration of the body have been determined depending on the leg strength and the sensor strength, and do not depend largely on the walking speed.

In view of this, in order to realize a walking pattern in which the vertical acceleration is produced fully up to its limit, an amplitude of vertical displacement may be determined which is constant regardless of the walking speed and for which the vertical acceleration is produced fully up to its limit.

Specifically, if the amplitude of vertical displacement is reduced in inversely or reciprocally proportional to the square of the walking speed V, then the actual vertical acceleration can be made substantially constant. As a result, a walking pattern can be realized which maximizes the mechanical properties of the robot which include the leg strength, the sensor strength, etc. at all walking speeds, while keeping a stable posture.

Based on the above, there can be generated a gait for a two-legged walking robot whose thigh links and crus links have a length of 400 mm respectively, whose ankle joints have a height of 140 mm, and whose weight is 100 kg, to walk at a walking speed of 2 km/h with a vertical acceleration of 2000 mm/sec$^2$. The amplitude of vertical displacement at this time is 22 mm.

Figure 18:
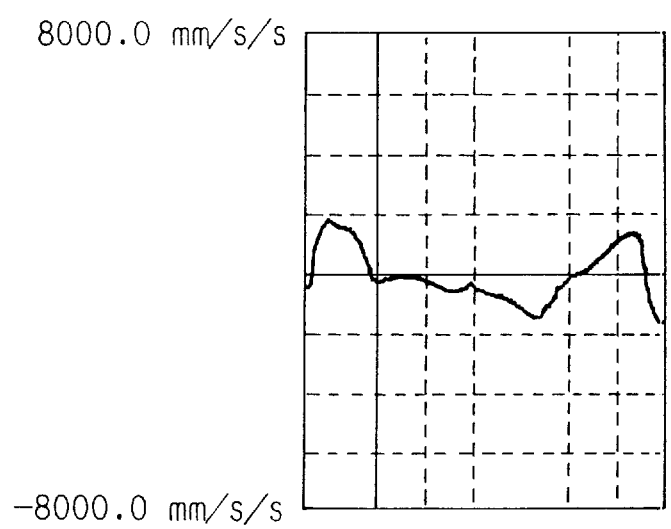
FIG. 18 is a diagram of data showing how the vertical acceleration varies as the amplitude of the vertical displacement varies in inverse proportion to the square of the walking speed when the two-legged walking robot shown in FIG. 1 walks at a walking speed of 3 km/h.
Figure 19:
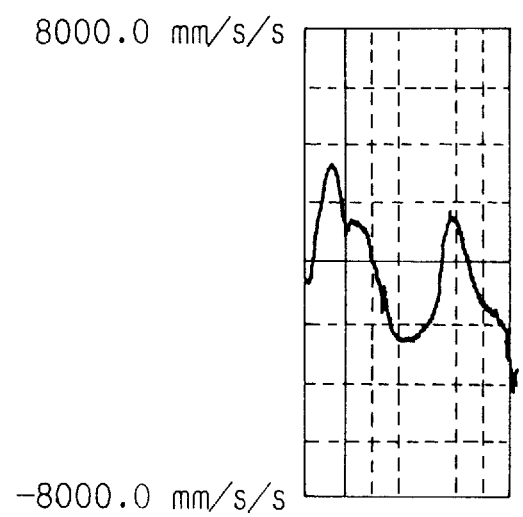
FIG. 19 is a diagram of data similar to FIG. 18, but showing the vertical acceleration when the two-legged walking robot shown in FIG. 1 walks at a walking speed of 5 km/h.

Based on the above gait, gait designing is carried out by varying the amplitude of vertical displacement of the body so as to be inversely or reciprocally proportional to the square of the walking speed. FIG. 18 shows the vertical acceleration of the robot in its entirety with respect to a gait in which the amplitude of vertical displacement is 9.7 mm at the walking speed of 3 km/h, which is $(2/3)^2=4/9$ times the amplitude of vertical displacement of 22 mm at the walking speed of 2 km/h. FIG. 19 shows the vertical acceleration of the robot in its entirety with respect to a gait in which the amplitude of vertical displacement is 3.5 mm at the walking speed of 5 km/h.

Figure 20:
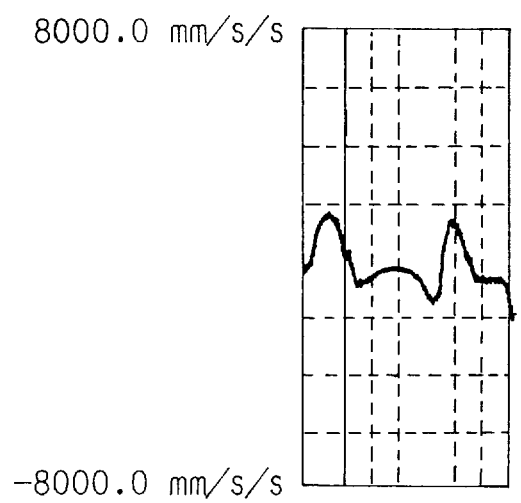
FIG. 20 is a diagram of data similar to FIG. 18, but showing the acceleration of only the body when the two-legged walking robot shown in FIG. 1 walks at a walking speed of 5 km/h.

At the walking speed of 3 km/h, the vertical acceleration is reduced as expected. At the walking speed of 5 km/h, however, the vertical acceleration is slightly increased. The vertical acceleration of only the body is shown in FIG. 20 for a detailed review of the above data. It can be seen from FIG. 20 that the vertical acceleration of only the body is well suppressed. This means that at the walking speed of 5 km/h, the vertical acceleration which is produced by forces of inertia (z-axis component) of the leg links (swinging leg) and which can be ignored with low-speed walking cannot be ignored.

Efforts to reduce the vertical displacement of the body 24 to cope with the above problem are of course irrelevant. If high-speed walking is needed, then some countermeasures such as a margin. for the strength in design are taken in view of factors which are responsible for increasing the vertical acceleration. With the amplitude of vertical displacement of the body being thus inversely or reciprocally proportional to the square of the walking speed, it is possible to reduce major components of shocks received from the ground due to the vertical acceleration of the robot in its entirety thereby dampening the shocks in a wide range of walking speeds.

More specifically, for establishing a maximum vertical acceleration for the body, it is necessary to take into account the dynamic strength of the robot, the rigidity of the ground surface, and the ability of the feet to contact the ground. Experimental data indicates that the ability of the feet to contact the ground is not problematic if the maximum vertical acceleration is about ±2000 mm/sec2 though its value depends on conditions.

Referring back to the flowchart shown in FIG. 4, the program loops through S26, S28, S20, S22, S24 for correcting to reduce the amplitude of vertical displacement of the trajectory of the body, and regenerating a gait for the trajectory thereby optimizing the gait. If the resulting vertical displacement is about the same as a desired value, then it is determined as an optimum gait which can actually be realized in S30.

After the optimum gait is determined, the program goes to S32 in which the angular velocity of each of the joints is determined directly as joint displacement with the gait. Then, in S34, a joint torque T is determined according to the equation:

$$T=(P-Z)\times F$$

where P is the position vector of the joint actuator at each time, Z is the position vector of the ZMP at each time, and F is the vector of the force from the ground which is determined by the motion of the center of gravity.

Because the maximum angular velocity and the maximum torque which are required for the joint actuator have thus been determined, specifications for the joint actuator which satisfies these maximum values are determined in S36.

An example of the present invention will be described below.

It is assumed that the robot 1 shown in FIG. 1 has parameters as shown in FIG. 21. The robot 1 has a weight of 100 kg, and the proportion (PS) of the double support phase in a period of time to start one walking step is 20%. A method of determining the amount of heel lifting for the robot to walk at a walking speed of 2 km/h and a step of 500 mm, and determining actuator specifications according to an optimum gait based on the amount of heel lifting, will be described below.

Figure 22:
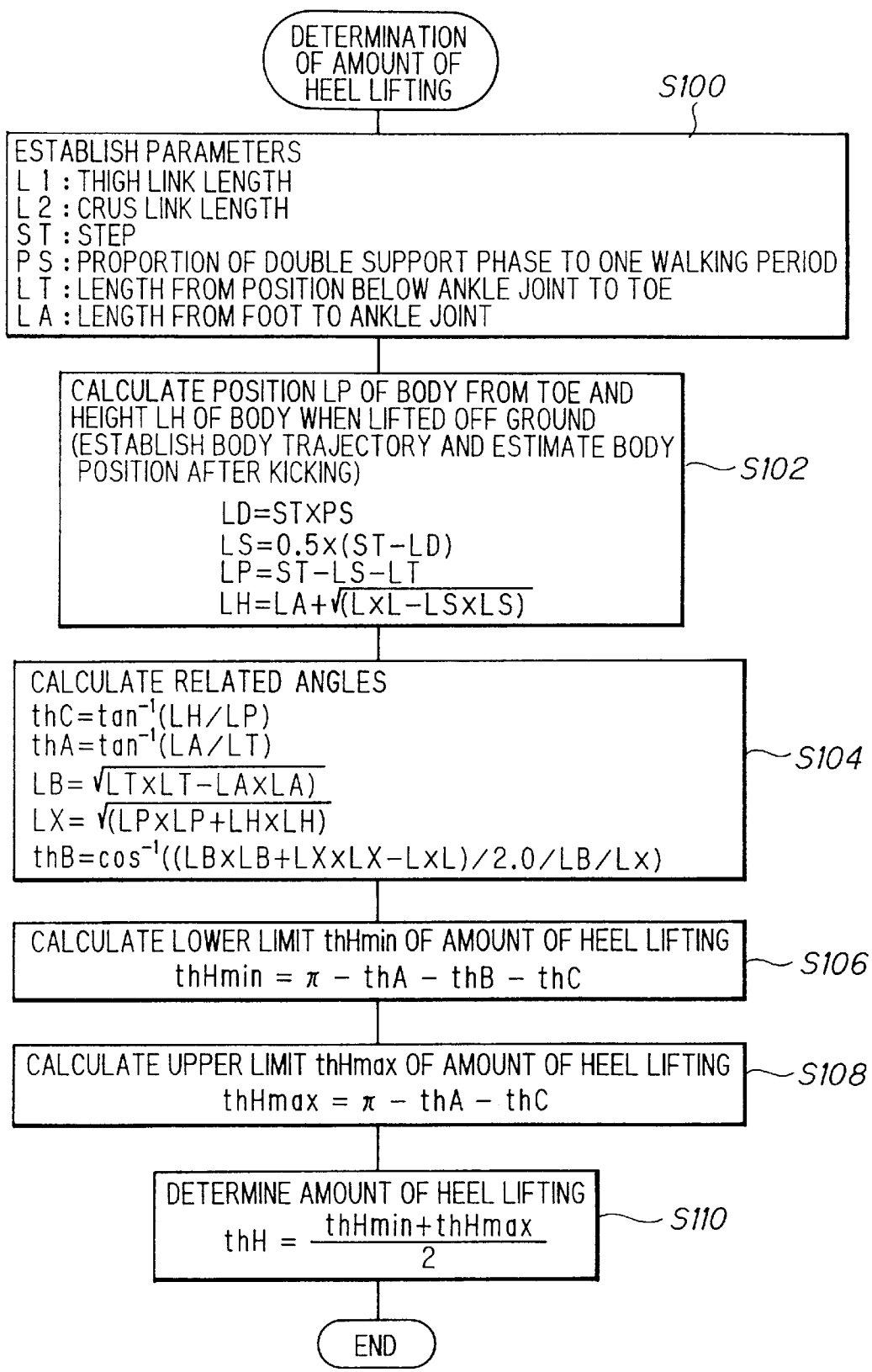
FIG. 22 is a flowchart showing the calculation of the amount of heel lifting.

The above data are applied to the equations, described above, for determining the amount (angle) of heel lifting. According to procedures shown in FIG. 22 composed of S100 through S110, an upper limit thHmax (56.29 degrees) and a lower limit thHmin (9.64 degrees) for the angle or amount are determined, and an angle or amount of 32.96 degrees, which is an average thH of these upper and lower limits, is determined as a design value for the amount of heel lifting.

Next, the trajectory of a swing leg should be generated under the condition that the angle through which to lift the heel 46b off the ground is 32.96 degrees. The trajectory should be generated to allow the leg to be brought forward smoothly in the walking period. To maintain the robustness against ground surface irregularities, the trajectory should be selected to lift the foot 22R(L) of the swing leg a certain amount or distance, e.g., 40 mm. The ZMP trajectory should be determined in view of dynamic conditions.

More specifically, in order to keep walking posture stability, the ZMP should basically be determined so as to be positioned in the vicinity of the center of the foot 22R(L) and to move smoothly forward within the double support phase. A transition period is included so that the ZMP moves smoothly from the end to the center of the foot before and after a transition between the double support phase and the single support phase. The trajectory of the center of gravity of the body should preferably be determined to be as high as possible based on the constraint conditions.

Figure 23:
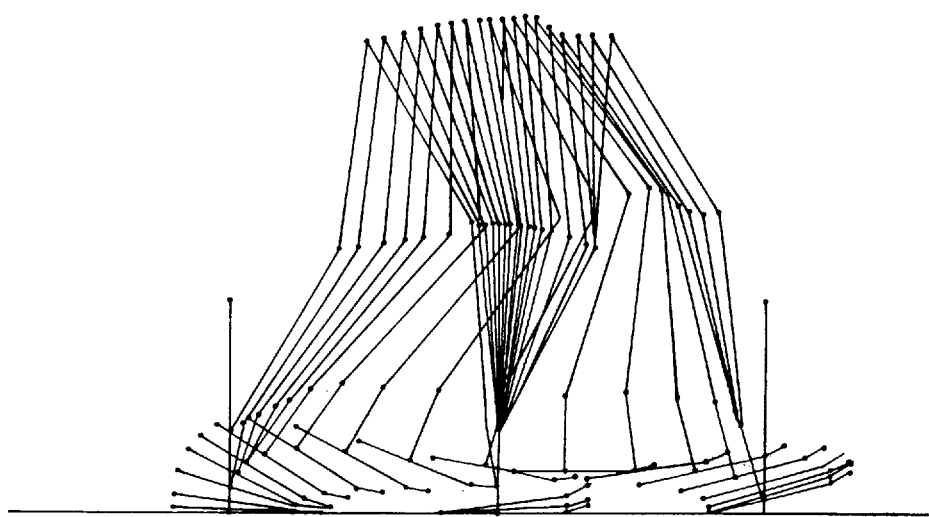
FIG. 23 is a diagram of simulated data showing a gait calculated by the procedures shown in FIG. 22.
Figure 24:
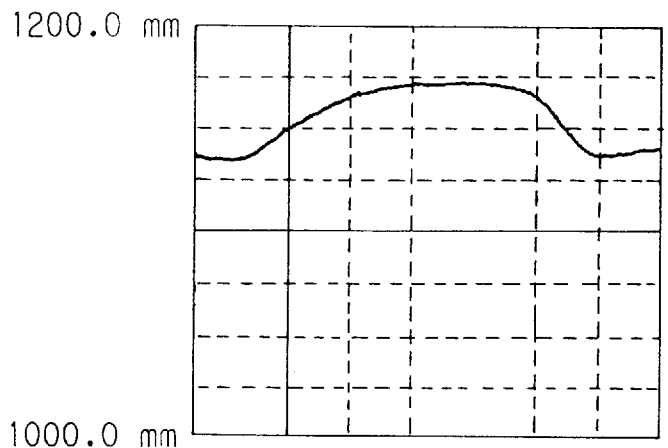
FIG. 24 is a diagram of data showing the trajectory of vertical displacement of the body in the gait shown in FIG. 23.

Under the above situations, the trajectory of a swing leg should be searched for to determine, at first, a gait such that a joint angular velocity desirable in actuator design is minimum. The gate thus determined will not satisfy a condition of vertical acceleration which mainly determines shocks from the ground. Here, the condition of vertical acceleration is ±2000 mm/sec². The gait, the trajectory of vertical displacement of the body, and the vertical acceleration are shown in FIGS. 23, 24, and 25.

Figure 25:
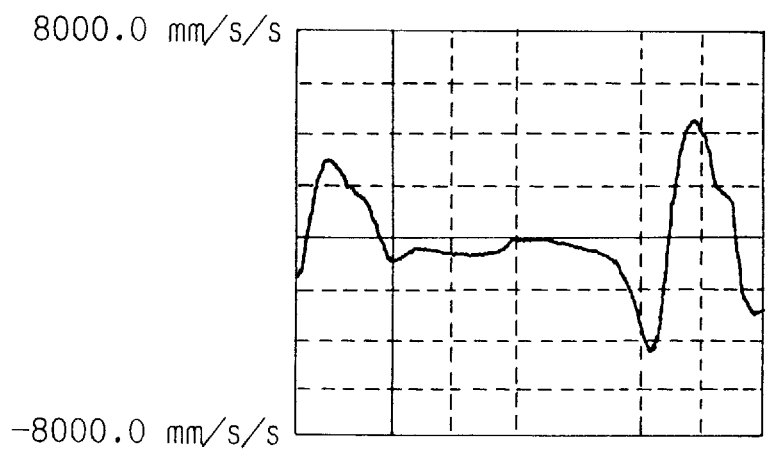
FIG. 25 is a diagram of data showing the vertical acceleration of the body in the gait shown in FIG. 23.
Figure 26:
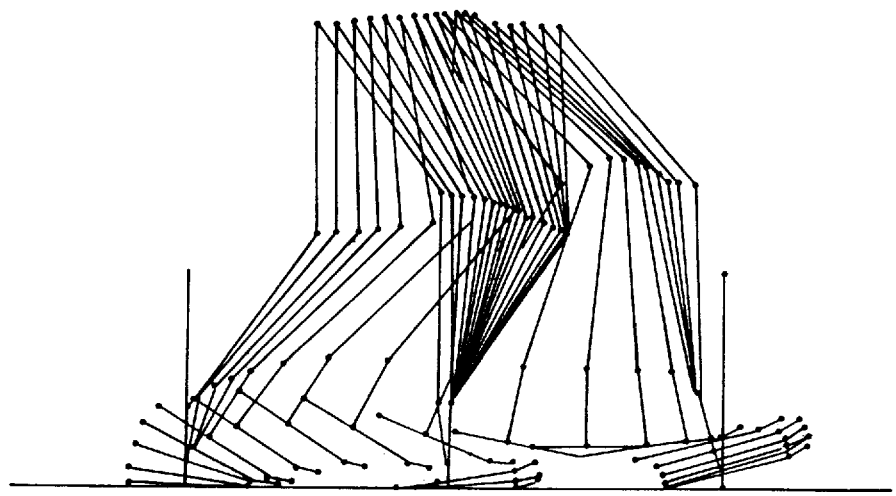
FIG. 26 is a diagram of simulated data showing a modification of the gait illustrated in FIG. 23.
Figure 27:
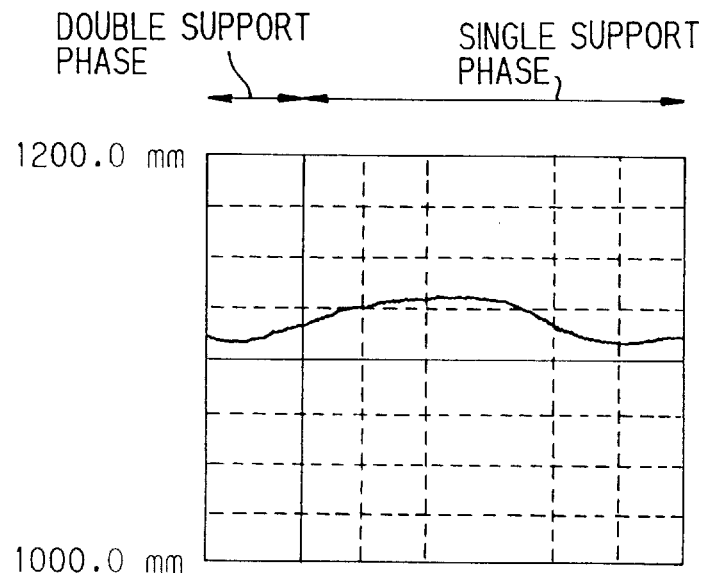
FIG. 27 is a diagram of data showing the trajectory of vertical displacement of the body in the gait shown in FIG. 26.
Figure 28:
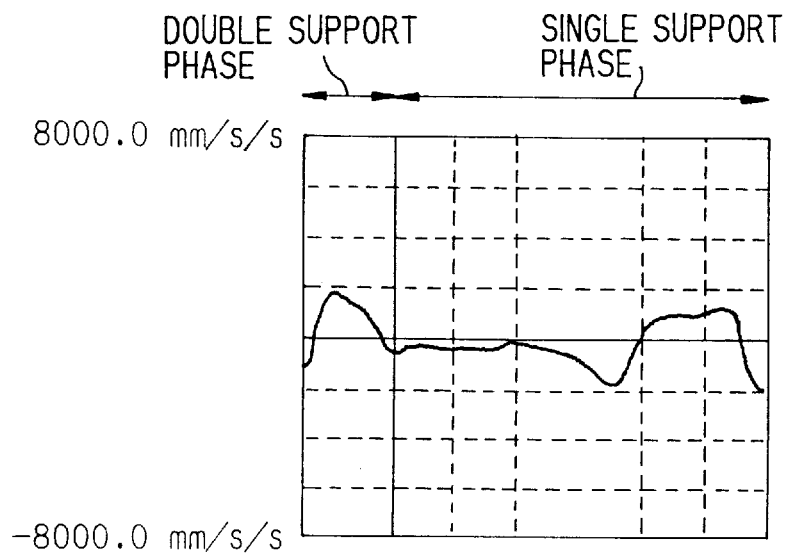
FIG. 28 is a diagram of simulated data showing the vertical acceleration of the body in the gait shown in FIG. 26.

As can be seen from FIG. 25, since the condition of vertical acceleration is exceeded, the trajectory of the body is corrected so as to reduce the amplitude of vertical displacement of the body which largely affects the vertical acceleration with respect to this gait, regenerating a new gait. The resultant gait is shown in FIGS. 26, 27, and 28. FIG. 28 shows that the gait satisfies the condition of vertical acceleration.

In this manner, it is possible to determine the gait which takes vertical acceleration into consideration.

Figure 29:
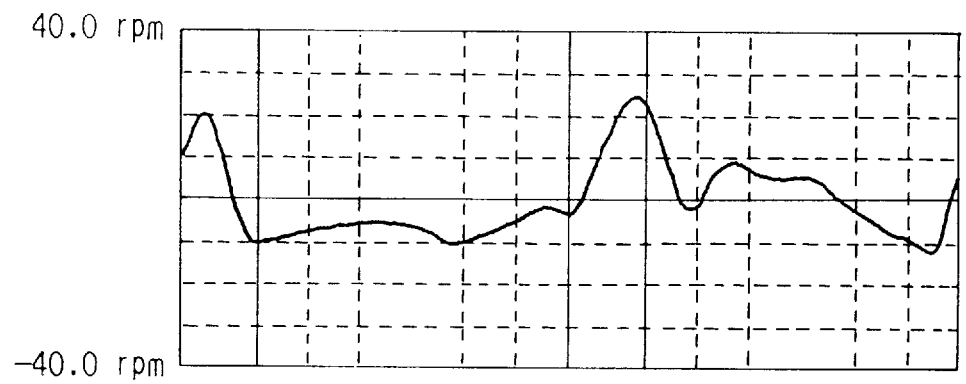
FIG. 29 is a diagram of simulated data showing the angular velocity of an ankle joint which is determined from the gait shown in FIG. 26.
Figure 30:
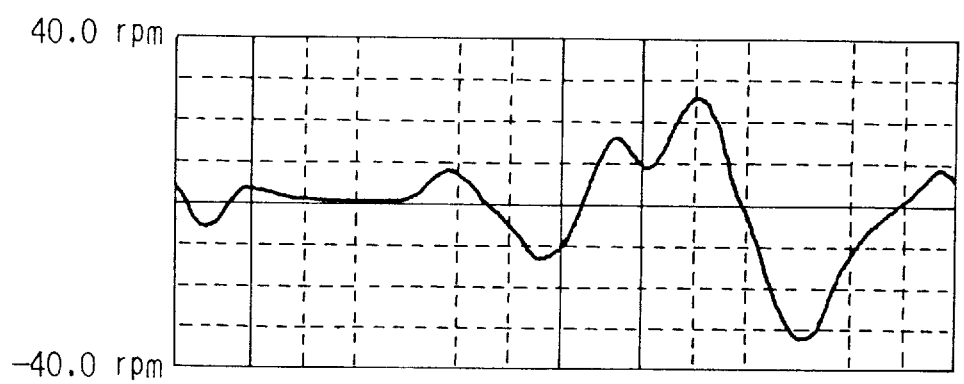
FIG. 30 is a diagram of simulated data showing the angular velocity of a knee joint which is determined from the gait shown in FIG. 26.
Figure 31:
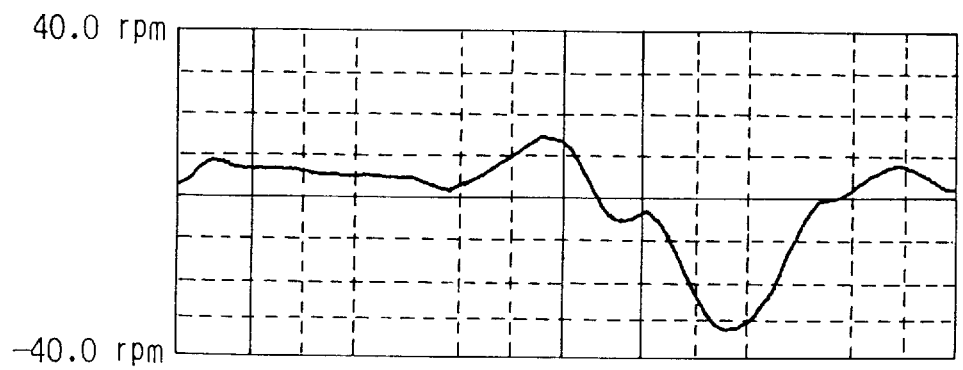
FIG. 31 is a diagram of simulated data showing the angular velocity of a hip joint which is determined from the gait shown in FIG. 26.

The angular velocity of each of the joints can directly be determined from the gait. The angular velocity of the ankle joint 18R(L) in this gait is shown in FIG. 29. The angular velocity of the knee joint 16R(L) in this gait is shown in FIG. 30. The angular velocity of the hip joint 12R(L) in this gait is shown in FIG. 31. Then, joint torques are determined according to simple calculations described above.

Figure 32:
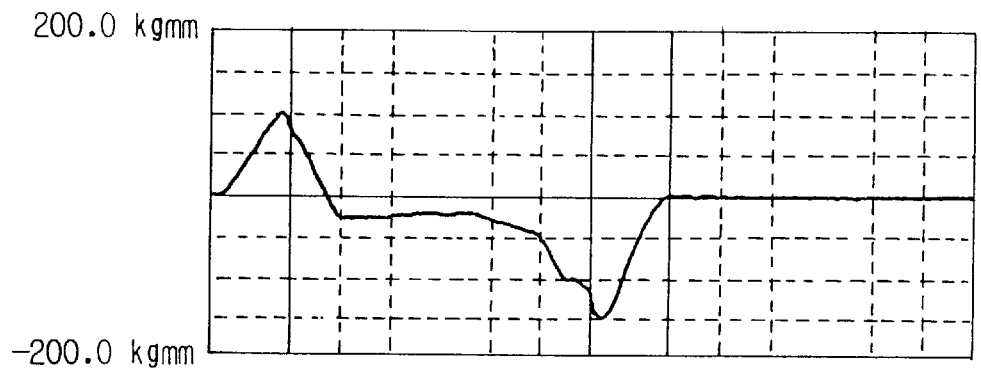
FIG. 32 is a diagram of simulated data showing the joint torque of the ankle joint which is determined from the gait shown in FIG. 26.
Figure 33:
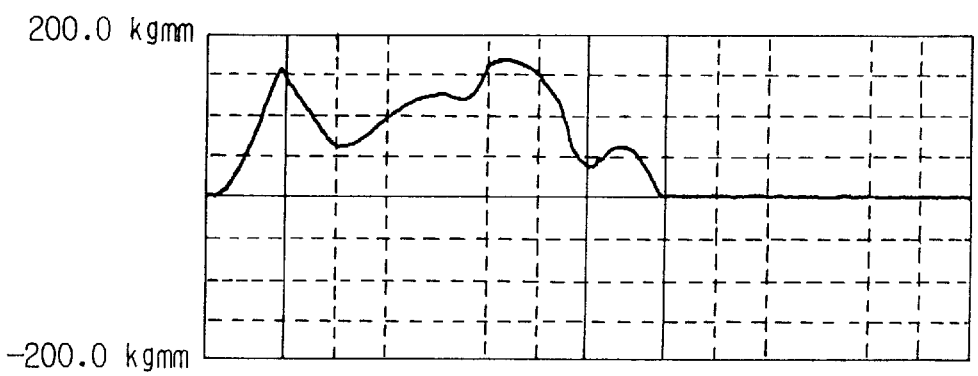
FIG. 33 is a diagram of simulated data showing the joint torque of the knee joint which is determined from the gait shown in FIG. 26.
Figure 34:
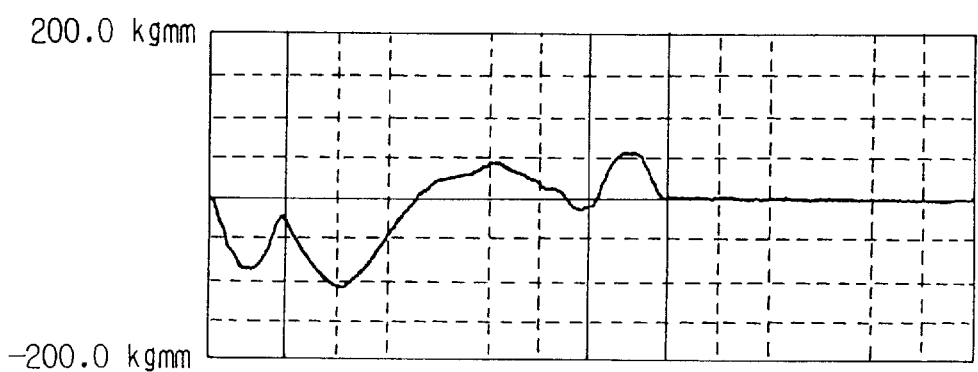
FIG. 34 is a diagram of simulated data showing the joint torque of the hip joint which is determined from the gait shown in FIG. 26.

The torque of the ankle joint 18R(L) in this gait is shown in FIG. 32. The torque of the knee joint 16R(L) in this gait is shown in FIG. 33. The torque of the hip joint 12R(L) in this gait is shown in FIG. 34. However, torques for actuating the swing leg are not included in the calculations. Since the calculated values are standardized on the condition that the weight of the robot is 1 kg, if the weight of the robot is 100 kg, then torques which are 100 times the calculated values are required.

It can be seen from these results that the maximum angular velocity and the maximum torque which are required for an actuator are 24 rpm and 15 kgm, respectively, for the ankle joint 18R(L), 32 rpm and 17 kgm, respectively, for the knee joint 16R(L), and 32 rpm and 11 kgm, respectively, for the hip joint 12R(L).

Figure 35:
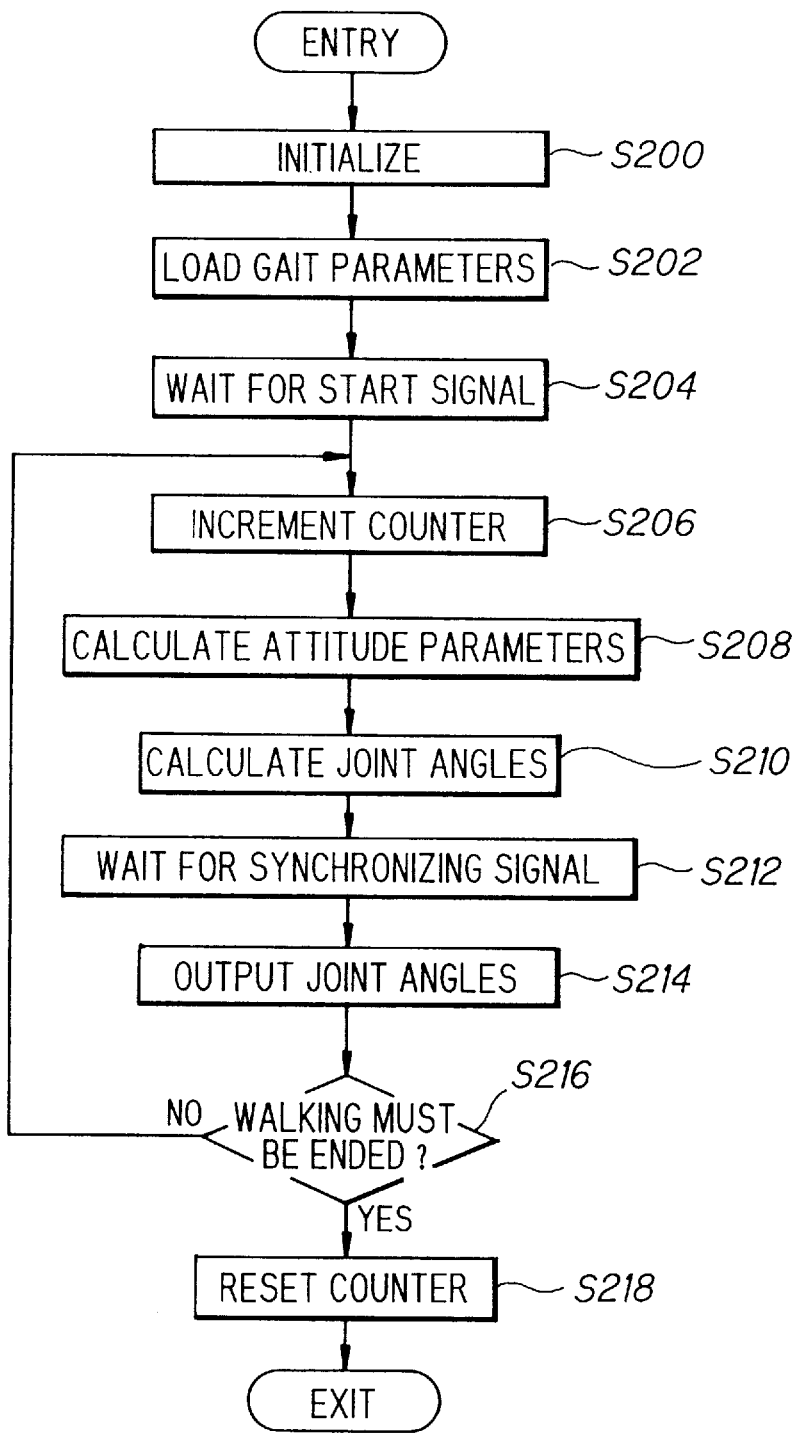
FIG. 35 is a flowchart showing the locomotion control of the twolegged walking robot shown in FIG. 1 based on the gait generated by the gait generating method according to the present invention.

Controlling the walking of the illustrated robot based on the gait thus generated will briefly be described below with reference to FIG. 35.

First, various parts of the systems are initialized in S200, and then gait parameters are loaded from the ROM 84 in S202. The gait generated in the manner described above for the robot has been stored as gait parameters in the ROM 84. Then, a start signal is waited for in S204. When the start signal is produced, a counter is incremented in S206.

Then, attitude parameters are calculated in S208. In S208, those of the gait parameters which need to be interpolated are determined, and attitude parameters are calculated at a time indicated by the counter in S206. Then, angles of the 12 joints are calculated in S210, a synchronizing signal is waited for in S212. When the synchronizing signal is produced, the calculated angles of the joints are output in S214. The above steps are repeated unless it is determined that the walking of the robot must be ended in S216. If the walking of the robot is to be ended, then the counter is reset in S218, and the program is terminated.

Figure 36:
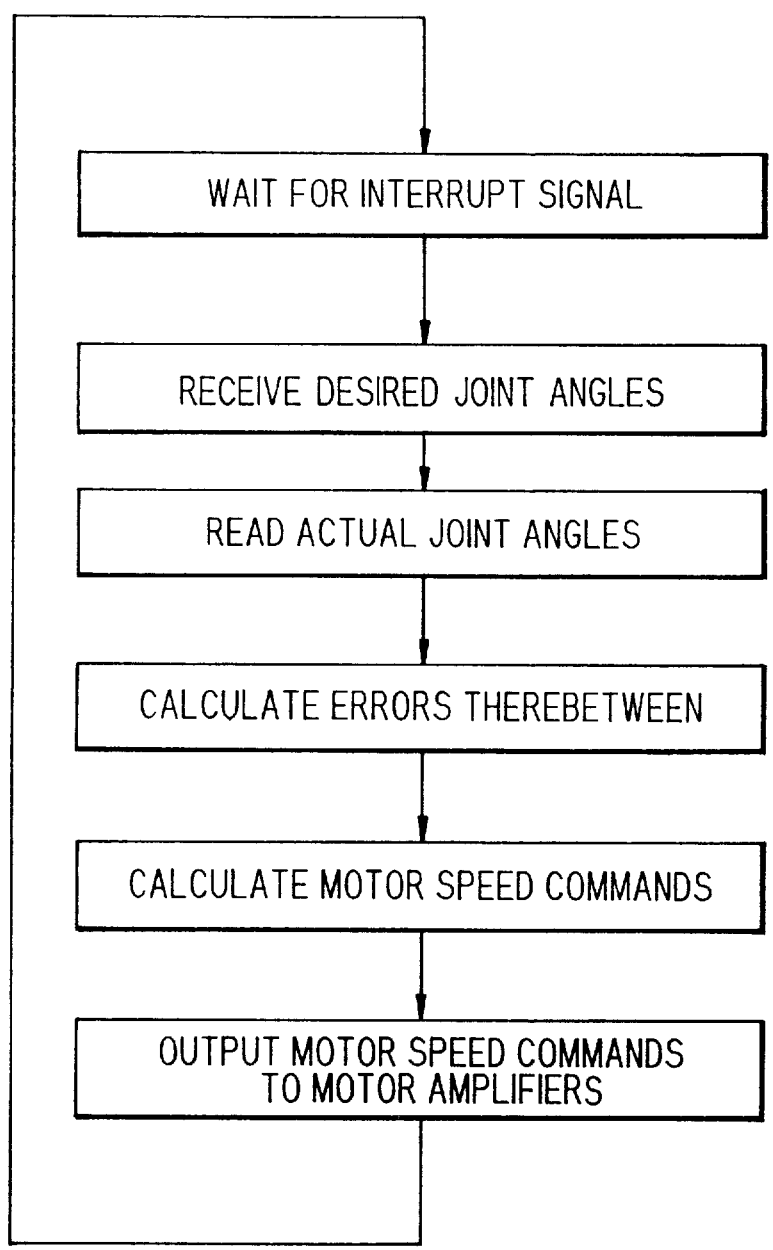
FIG. 36 is a flowchart showing a servo control for joint angles in the control shown in FIG. 35.

Based on the angles of the joints which are output in S214, the second calculating unit 82 shown in FIG. 3 concurrently carries out a servo control for the angles of the joints as shown in FIG. 36. Such a servo control is known in the art and will not be described.

As described above, according to the embodiment of the invention, there is provided a method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks the ground to walk in a direction; the method comprising the steps of estimating a position of the robot body at a time when the hind leg has kicked the ground; determining an amount of lifting, in the direction of gravity, of a heel of the foot of the hind leg such that the robot body will reach at least the estimated position; and generating the gait based at least on the determined amount of foot heel lifting.

According to another aspect of the invention, there is provided a method for generating a gait of a two-legged walking robot having at least a body, two articulated legs each connected to the body through hip joints and each including a thigh link, a crus link connected to the thigh link through a knee joint and a foot connected to the crus link through an ankle joint, the robot being configured to driven the articulated legs as a foreleg and a hind leg such that the hind leg kicks the ground to walk in a direction; the method comprising the steps of determining a parameter relating to the robot walking; determining an amplitude in a trajectory of a displacement, in the direction of gravity, of a center of gravity of the robot; and generating the gait based at least on the determined amplitude.

According to still another aspect of the invention, there is provided a method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; the method comprising the steps of determining a first parameter relating to at least one of energy consumption efficiency and posture stabilization of the robot; determining a second parameter relating to walking of the robot; and generating a gait based at least on the determined first and second parameters.

According to yet still another aspect of the invention, there is provided a system for controlling a locomotion of a two-legged walking robot having at least a body, two articulated legs each connected to the body through hip joints and each including a foot at its end connect through an ankle joint such that the foot is rotated in a plane including an axis of gravity, the robot has a consecutive walking period each made up of a single support phase during which the robot body is supported by either of the articulated legs and a double support phase during which the robot body is supported by the two articulated legs such that it walks with a step by changing the two support phases in turn, comprising foot rotation amount determining means for determining an amount of rotation of the foot; joint angle determining means for determining angles of the joints at least based on the amount of foot rotation; and joint driving means for driving the joints such that the double support is changed to the single support phase.

With the arrangement, it becomes possible to generate an optimum gait, by determining in advance the amount of heel lifting of a kicking foot which is suitable for realizing the gait with a high trajectory of the center of gravity, i.e., a high energy consumption efficiency. With the amount of lift of the heel being thus determined beforehand, gait candidates can be selected from a large number of gaits which satisfy physical conditions that allow the robot to walk. As a consequence, the designing of a gait can be greatly simplified.

The generation of the gait can further be simplified since a certain standard is obtained for the acceleration of vertical displacement which has a close relationship with shocks from the ground (ground reaction force), from the amplitude of vertical displacement of the center of gravity.

Moreover, it becomes possible to, among numerous possible gaits that satisfy physical conditions which permit the robot to walk, to select possible candidates and to generate a gait of a practical two-legged walking robot which allows actuators and their operating speeds to be quantitatively designed or determined and which achieves a walking pattern with a minimum of undue stress to lessen shocks of the ground that are of importance for a practical robot. More specifically, since the amplitude in a trajectory of a displacement in the direction of gravity of a center of gravity of the robot body and the gait is generated based at least on the determined amplitude, the shocks can be decreased. The locomotion can be determined within a wide range of velocities which is appropriate for the robot. The possible candidates or solution can be decreased, thereby simplifying the robot gait generation.

Figure 37:
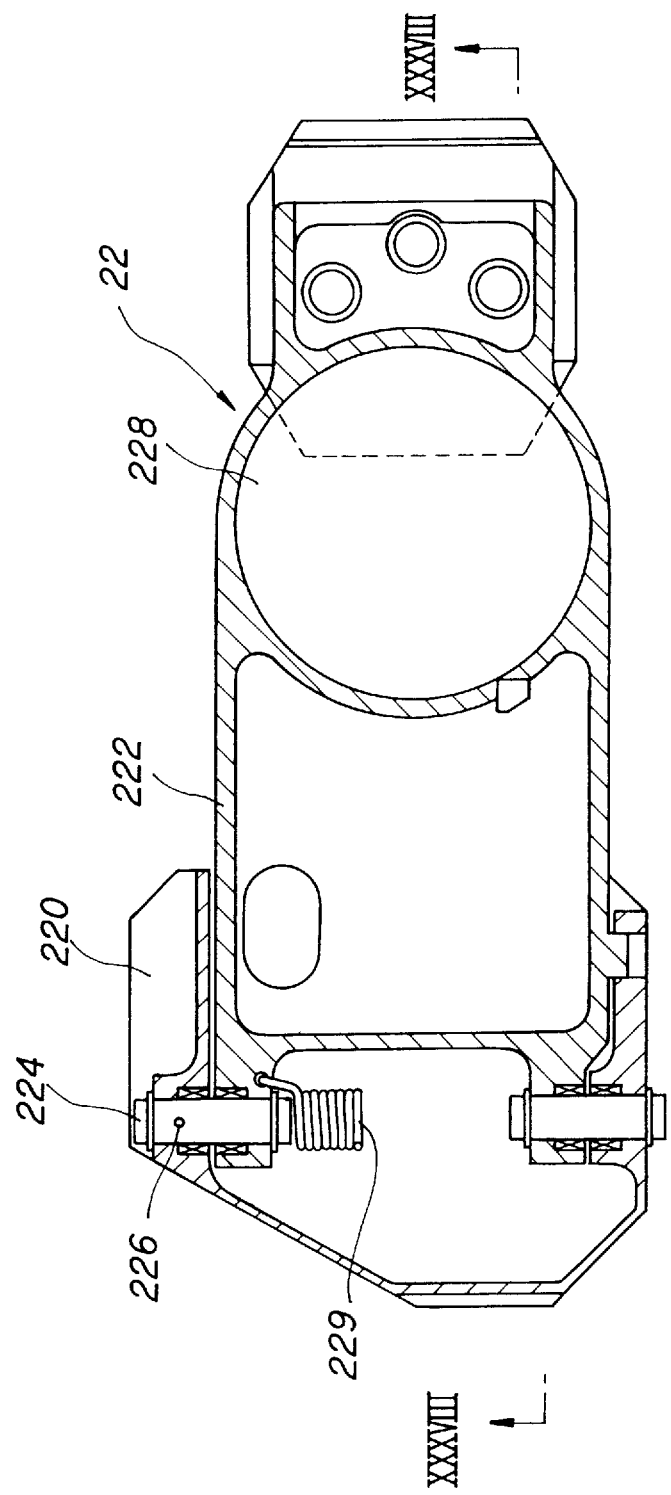
FIG. 37 is a cross-sectional view of a foot of another two-legged walking robot to which the gait generating method and a locomotion control system according to the present invention are applied.
Figure 38:
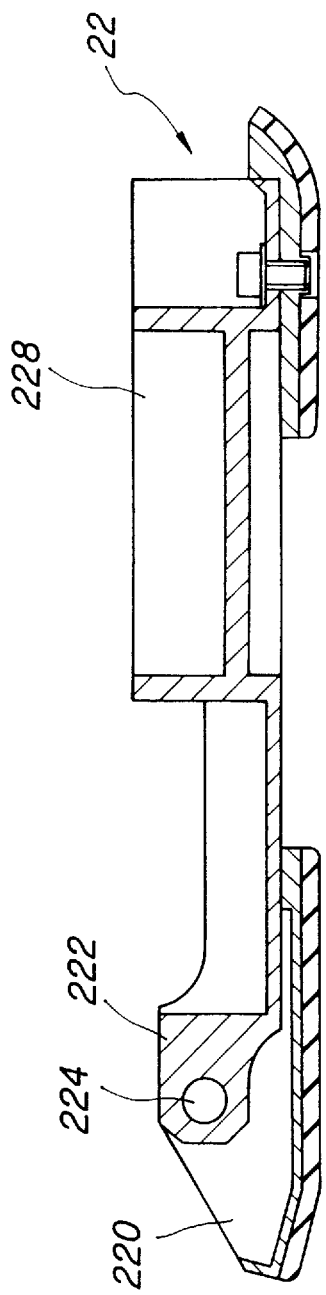
FIG. 38 is a cross-sectional view taken along line XXXVIII—XXXVIII of FIG. 37.
Figure 39:
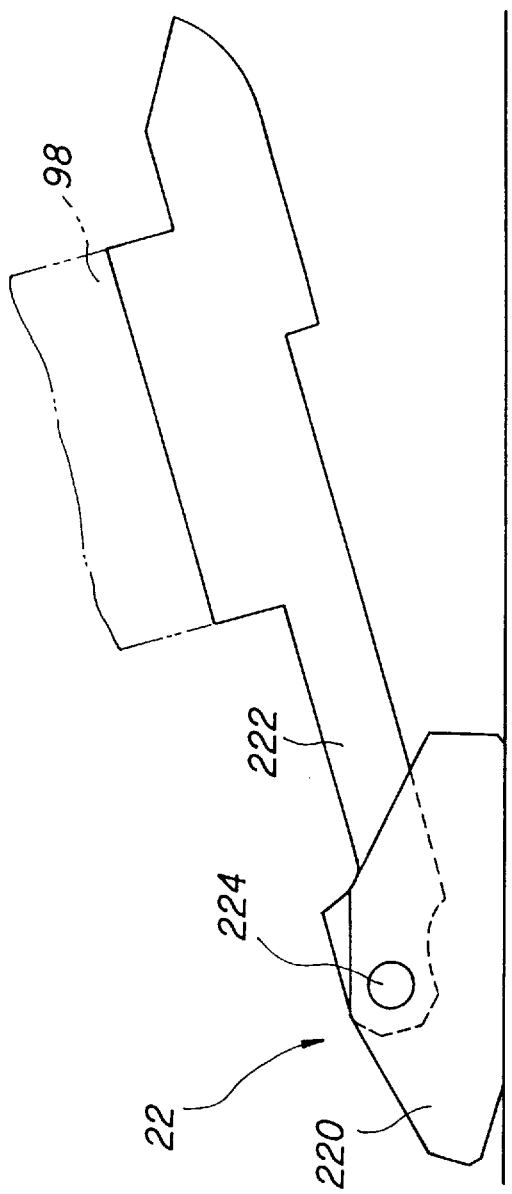
FIG. 39 is a side elevational view of the foot shown in FIG. 37 with its heel lifted.

FIGS. 37 through 39 show a foot configuration of another two-legged walking robot to which the gait generating method according to the present invention is applicable.

As shown in FIGS. 37 through 39, the foot comprises a substantially C-shaped member 220 and a substantially rectangular member 222 which are joined to each other by rods 224. The rods 224 are inserted in holes that are defined in the C-shaped member 220 and the rectangular member 222. The rod 224 is fixed to the Cshaped member 220 by a pin 226. The rods 224 serve as a toe joint. The holes defined in the rectangular member 222 have a diameter which is larger than the outside diameter of the rods 224, so that the rectangular member 222 is angularly movable or rotatable about the rods 224. The rectangular member 222 has a large circular hole 228 defined therein near its center. The aforesaid six-dimensional force and torque sensor (not shown) is disposed in the circular hole 228, and the ankle joint 18, 20R(L) (see FIG. 1) is connected to an upper portion of the wall which defines the circular hole 228 therein.

A spring 229 is disposed around one of the rods 224 and acts between the rod 224 and the rectangular member 222 for normally urging the rectangular member 222 to turn upwardly in the direction of gravity. Therefore, when the ankle joint 18 is turned about its axis 36 (see FIG. 2), the rectangular member 222 follows to lift off the ground. At this time, only the C-shaped member 220 at the sole of the foot is held in contact with the ground. It may be difficult to accurately determine the length (the aforesaid length LT in FIG. 10) up to the toe of the foot shown in FIG. 37. However, a length up to a point which is considered equivalently to be a fulcrum at the time the heel is lifted may basically be used as the length.

In the arrangement shown in FIG. 37, since the axis of the toe joint is slightly higher than the ground surface, it is not strictly correct to regard the distance to the axis as the length. However, the distance to the axis before the toe can approximately be used as the length except for extreme foot configurations.

Foot configurations to which the above length approximation is not applicable are possibly present in a wide range, and hence specific method cannot be presented for all such foot configurations. However, the amount of heel lifting can similarly be calculated based on convergency calculations or the like.

In the above description, the center of gravity of the robot is approximated by the center of gravity of the body thereof. However, the center of gravity of the robot in its entirety may instead be determined.

While only the two-legged walking robot has been described above, the principles of the present invention are basically applicable to walking robots with three or more legs.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; the method comprising the steps of:

(a) estimating a first position of the robot body at a time when the hind leg has kicked the ground;
   (b) estimating a second position of the robot body a predetermined amount advanced in the direction from the first position;
   (c) determining a first amount of lifting, in the direction of gravity, of a heel of the foot of the hind leg such that the robot body will reach at least the estimated first position;
   (d) determining a second amount of lifting, in the direction of gravity, of the heel of the foot of the hind leg such that the robot body will reach at least the estimated second position; and
   (e) generating a gait based at least on the first amount and the second amount of foot heel lifting.

2. A method according to claim 1, wherein the step (d) comprises:
   (g) determining the second amount of foot heel lifting as a lower limit;
   (h) determining a third amount of foot heel lifting at a condition in which the hip joint, the ankle joint and a toe of the hind leg are substantially aligned with each other;
   (i) determining the second amount of foot heel lifting as an upper limit; and
   (j) determining the amount of heel lifting such that it is within a range defined by the lower limit and the upper limit.

3. A method according to claim 2, wherein the step (j) comprises:
   (k) calculating an average of the lower limit and the upper limit; and
   (l) determining the average as the amount of heel lifting.

4. A method according to claim 1, wherein a sole of the foot is curved to form a curved toe such that the foot is rotated about the ankle joint, bringing the curved toe into contact with the ground, to lift the heel in the direction of gravity.

5. A method according to claim 1, wherein the foot has a toe joint such that the foot is rotated about the toe joint to lift the heel in the direction of gravity.

6. A method according to claim 1, further including the step of:
   (m) determining an actuator based at least on the generated gait.

7. A method according to claim 1, further including the step of:
   (m) determining an actuator based at least on the generated gait.

8. A method according to claim 2, further including the step of:
   (m) determining an actuator based at least on the generated gait.

9. A method according to claim 3, further including the step of:
   (m) determining an actuator based at least on the generated gait.

10. A method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; the method comprising the steps of:
   (n) determining walking speed of the robot;
   (o) determining an amplitude in a trajectory of a displacement, in the direction of gravity, of a center of gravity of the robot based at least on walking speed and
   (p) generating a gait based at least on the determined amplitude.

11. A method according to claim 10, wherein:
the step (o) comprises;

(r) determining the amplitude such that it decreases with increasing walking speed.

12. A method according to claim 10; wherein:

the step (q) comprises;

(s) determining the amplitude such that it is reciprocally proportional to a square of the walking speed.

13. A method according to claim 10, wherein:

the step (o) comprises:

(t) determining the amplitude such that an acceleration of the displacement is at or below a predetermined value.

14. A method according to claim 10, wherein the center of the gravity is the center of gravity of the robot body.

15. A method according to claim 10, wherein the amplitude is determined also based on a walking step of the robot.

16. A method according to claim 10, further including the step of:

(u) determining an actuator based at least on the generated gait.

17. A method according to claim 11, further including the step of:

(u) determining an actuator based at least on the generated gait.

18. A method according to claim 12, further including the step of:

(u) determining an actuator based at least on the generated gait.

19. A method according to claim 13, further including the step of:

(u) determining an actuator based at least on the generated gait.

20. A method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; the method comprising the steps of:

(v) determining a first parameter relating to at least one of energy consumption efficiency and posture stabilization of the robot wherein the first parameter relates to at least one of an amount of lifting of a heel of the foot of the hind leg and an amplitude in a trajectory of a displacement of a center of the gravity of the robot;

(w) determining a second parameter relating to the walking of the robot; and (x) generating a gait based at least on the determined first and second parameters.

21. A method according to claim 20, wherein the second parameter relates to a walking speed of the robot.

22. A method according to claim 21, wherein the second parameter includes a third parameter that relates to a walking step of the robot.

23. A method according to claim 20, further including the step of:

(y) determining an actuator based at least on the generated gait.

24. A method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; comprising:

first and second body position estimating means for estimating a first position of the robot body at a time when the hind leg has kicked the ground and for estimating a second position of the body a predetermined distance in advance of the first position;

first and second heel lifting amount determining means for determining first and second amounts of lifting, in the direction of gravity, of a heel of the foot of the hind leg such that the robot body will reach at least the first and second estimated positions; and gait generating means generating a gait based at least on the determined first and second amounts of foot heel lifting.

25. A system according to claim 24, wherein the heel lifting amount determining means determines the second amount of foot heel lifting as a lower limit; determines a third amount of foot heel lifting at a condition in which the hip joint, the ankle joint and a toe of the hind leg are substantially aligned with each other; and determines the second amount of foot heel lifting as an upper limit; and determines the amount of heel lifting such that it is within a range defined by the lower limit and the upper limit.

26. A system according to claim 25, wherein the heel lifting amount determining means calculates an average of the lower limit and the upper limit and determines the average as the amount of heel lifting.

27. A system according to claim 24, wherein a sole of the foot is curved to form a curved toe such that the foot is rotated about the ankle joint, bringing the curved toe into contact with the ground, to lift the heel in the direction of gravity.

28. A system according to claim 24, wherein the foot has a toe joint such that the foot is rotated about the toe joint to lift the heel in the direction of gravity.

29. A system according to claim 24, further including:

actuator determining means for determining actuator based at least on the generated gait.

30. A method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; comprising:

walking speed determining means for determining walking speed of the robot;

amplitude determining means for determining an amplitude in a trajectory of a displacement in the direction of gravity, of a center of gravity of the robot based at least on walking speed; and gait generating means for generating a gait based at least on the determined amplitude.

31. A system according to claim 30, wherein the amplitude determining means determines the amplitude such that it decreases with increasing walking speed.

32. A system according to claim 30, wherein the amplitude determining means determines the amplitude such that it is reciprocally proportional to a square of the walking speed.

33. A system according to claim 30, wherein the amplitude determining means determines the amplitude such that an acceleration of the displacement is at or below a predetermined value.

34. A system according to claim 30, wherein the center of the gravity is the center of gravity of the robot body.

35. A system according to claim 30, wherein the amplitude determining means determines an amplitude also based on a second parameter that is a walking step of the robot.

36. A system according to claim 30, further including:

actuator determining means for determining an actuator based at least on the generated gait.

37. A method for generating a gait of a two-legged walking robot having at least a body, two articulated legs each connected to the body through a hip joint and each including a thigh link, a crus link connected to the thigh link through a knee joint and a foot connected to the crus link through an ankle joint, the robot being configured to drive the articulated legs as a foreleg and a hind leg such that the hind leg kicks ground to walk in a direction; comprising:

first parameter determining means for determining a first parameter relating to at least one of energy consumption efficiency and posture stabilization of the robot wherein the first parameter relates to at least one of an amount of lifting of a heel of the foot of the hind leg and an amplitude in a trajectory of a displacement of a center of gravity of the robot;

second parameter determining means for determining a second parameter relating to walking of the robot; and gait generating means for generating a gait based at least on the determined first and second parameters.

38. A system according to claim 37, wherein the second parameter relates to a walking speed of the robot.

39. A system according to claim 38, wherein the second parameter includes a third parameter that relates to a walking step of the robot.

40. A system according to claim 37, further including:

actuator determining means for determining an actuator based at least on the generated gait.

41. A system for controlling a locomotion of a two-legged walking robot having at least a body, two articulated legs each connected to the body through hip joints, and a foot connected to each leg through an ankle joint such that the foot is rotated in a plane including an axis of gravity, the robot having consecutive walking period each made up of a single support phase, during which the robot body is supported by either of the articulated legs, and a double support phase during which the robot body is supported by the two articulated legs, such that the robot walks with a step by changing the two support phases in turn, comprising:

foot rotation amount determining means for determining an amount of rotation of the foot based at least on an equation defined as:

$$thH = f(PS, ST)$$

(where thH is the amount of foot rotation (angle), PS is a proportion of the double support phase in the walking period, and ST is the step);

joint angle determining means for determining angles of the joints at least based on the amount of foot rotation; and joint driving means for driving the joints such that the double support is changed to the single support phase.

42. A system for controlling a locomotion of a two-legged walking robot having at least a body, two articulated legs each connected to the body through hip joints, and a foot connected to each leg through an ankle joint such that the foot is rotated in a plane including an axis of gravity, the robot having a consecutive walking periods each made up of a single support phase, during which the robot body is supported by either of the articulated legs, and a double support phase during which the robot body is supported by the two articulated legs, such that the robot walks with a step by changing the two support phases in turn, comprising:

foot rotation amount determining means for determining an amount of rotation of the foot based at least on an equation defined as:

$$thH = \pi - thA - thB - thC$$

(where thH is the amount of foot rotation (angle), and thA, thB and thC are amounts of rotations (angles) determined by a posture of the robot);

joint angle determining means for determining angles of the joints at least based on the amount of foot rotation; and joint driving means for driving the joints such that the double support is changed to the single support phase.

* * * * *

UNITED STATES PATENT AND TRADEMARK OFFICE
CERTIFICATE OF CORRECTION

PATENT NO.    : 5,808,433
DATED         : September 15, 1998
INVENTOR(S)   : Tagami et al.

It is certified that error appears in the above-identified patent and that said Letters Patent is hereby corrected as shown below:

<u>Title page,</u>
Item [56], "FOREIGN PATENT DOCUMENTS", delete "a1" and substitute -- A1 --.
Item [56], "OTHER PUBLICATIONS",
Delete "IEE/RS)" and substitute -- IEEE/RSJ --.
Correct the spelling of the word "Plastic".

<u>Column 23,</u>
Line 4, delete "step (q)" and substitute -- -- step (o) --.

<u>Column 25,</u>
Line 2, before "gravity" (first occurrence) delete "the".
Line 42, change "period" to -- periods --.

<u>Column 26,</u>
Line 23, before "consecutive" delete "a".

Signed and Sealed this

Seventeenth Day of September, 2002

Attest:

JAMES E. ROGAN
*Attesting Officer*    *Director of the United States Patent and Trademark Office*